United States Patent
Li et al.

(10) Patent No.: US 9,877,193 B2
(45) Date of Patent: Jan. 23, 2018

(54) METHODS AND APPARATUS FOR USER AUTHENTICATION AND HUMAN INTENT VERIFICATION IN MOBILE DEVICES

(71) Applicant: Apple Inc., Cupertino, CA (US)

(72) Inventors: Li Li, Los Altos, CA (US); Xiangying Yang, Cupertino, CA (US); Jerrold Von Hauck, Windermere, FL (US); Christopher B. Sharp, Cupertino, CA (US); Yousuf H. Vaid, Fremont, CA (US); Arun G. Mathias, Sunnyvale, CA (US); David T. Haggerty, San Francisco, CA (US); Najeeb M. Abdulrahiman, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/076,527

(22) Filed: Mar. 21, 2016

(65) Prior Publication Data

US 2016/0277930 A1     Sep. 22, 2016

Related U.S. Application Data

(60) Provisional application No. 62/136,596, filed on Mar. 22, 2015, provisional application No. 62/146,896, filed on Apr. 13, 2015.

(51) Int. Cl.
*H04M 1/66*     (2006.01)
*H04M 1/68*     (2006.01)
(Continued)

(52) U.S. Cl.
CPC ............ *H04W 12/06* (2013.01); *H04L 41/28* (2013.01); *H04L 63/083* (2013.01); *H04L 63/0838* (2013.01); *H04L 63/0853* (2013.01)

(58) Field of Classification Search
CPC ............... H04W 12/06; H04L 63/0838; H04L 63/0853; H04L 41/28; H04L 63/083
See application file for complete search history.

(56) References Cited

U.S. PATENT DOCUMENTS

| 9,231,925 | B1* | 1/2016 | Lundstrom | ............... H04L 9/30 |
| 2012/0108204 | A1* | 5/2012 | Schell | ................... H04W 8/205 |
| | | | | 455/411 |

(Continued)

FOREIGN PATENT DOCUMENTS

| WO | 2013/015729 A1 | 1/2013 |
| WO | 2013/124635 A1 | 8/2013 |

OTHER PUBLICATIONS

PCT International Search Report; PCT/US2016/023062 dated Jun. 28, 2016 (3 pages).

(Continued)

*Primary Examiner* — Ajit Patel
(74) *Attorney, Agent, or Firm* — Downey Brand LLP

(57) ABSTRACT

Methods and apparatus for user authentication and human intent verification of administrative operations for eSIMs of an eUICC included in a mobile device are disclosed. Certain administrative operations, such as import, modification, and/or export, of an eSIM and/or for an eUICCs firmware can require user authentication and/or human intent verification before execution of the administrative operations are performed or completed by the mobile device. A user of the mobile device provides information to link an external user account to an eSIM upon (or subsequent to) installation on the eUICC. User credentials, such as a user name and password, and/or information generated therefrom, can be used to authenticate the user with an external server. In response to successful user authentication, the administrative operations are performed. Human intent verification can also be performed in conjunction with user authentication to (Continued)

prevent malware from interfering with eSIM and/or eUICC functions of the mobile device.

20 Claims, 21 Drawing Sheets

(51) Int. Cl.
*H04M 3/16* (2006.01)
*H04W 12/06* (2009.01)
*H04L 29/06* (2006.01)
*H04L 12/24* (2006.01)

(56) References Cited

U.S. PATENT DOCUMENTS

| | | | |
|---|---|---|---|
| 2012/0108205 A1* | 5/2012 | Schell | H04W 4/001 455/411 |
| 2012/0331292 A1* | 12/2012 | Haggerty | H04L 63/0272 713/168 |
| 2013/0205390 A1 | 8/2013 | Hauck et al. | |
| 2013/0227646 A1 | 8/2013 | Haggerty et al. | |
| 2014/0004827 A1 | 1/2014 | O'Leary | |
| 2014/0237101 A1* | 8/2014 | Park | H04L 67/303 709/223 |

OTHER PUBLICATIONS

PCT International Written Opinion; PCT/US2016/023062 dated Jun. 28, 2016 (7 pages).

* cited by examiner

METHODS AND APPARATUS FOR USER AUTHENTICATION AND HUMAN INTENT VERIFICATION IN MOBILE DEVICES

CROSS-REFERENCE TO RELATED APPLICATIONS

This Application claims the benefit of U.S. Provisional Application No. 62/136,596, entitled "METHODS AND APPARATUS FOR USER AUTHENTICATION AND HUMAN INTENT VERIFICATION IN MOBILE DEVICES", filed Mar. 22, 2015, and U.S. Provisional Application No. 62/146,896, entitled "METHODS AND APPARATUS FOR USER AUTHENTICATION AND HUMAN INTENT VERIFICATION IN MOBILE DEVICES", filed Apr. 13, 2015, the contents of both of which are incorporated by reference herein in their entirety for all purposes.

FIELD

The described embodiments set forth techniques for user authentication and human intent verification of administrative operations for integrated components—such as embedded Universal Integrated Circuit Cards (eUICCs) configured to manage electronic Subscriber Identity Modules (eSIMs)—within mobile devices.

BACKGROUND

Many mobile devices are configured to receive removable Universal Integrated Circuit Cards (UICCs) that enable the mobile devices to access services provided by mobile network operators (MNOs). In particular, each UICC includes at least a microprocessor and a read-only memory (ROM), where the ROM is configured to store an MNO profile that the mobile device can utilize to register and interact with an MNO. Typically, a UICC takes the form of a small removable card (commonly referred to as a SIM card) that is configured to be inserted into a UICC-receiving bay included in a mobile device. In more recent implementations, however, UICCs are being embedded directly into system boards of mobile devices. Notably, these embedded UICCs (eUICCs) can provide several advantages over traditional, removable UICCs. For example, some eUICCs include a rewritable memory that can facilitate installation, modification, and/or deletion of one or more eSIMs, which can provide for new and/or different services and/or updates for accessing extended features provided by MNOs. eUICCs can also eliminate the need for UICC-receiving bays within mobile devices. The adoption of eUICCs, therefore, not only increases the flexibility of mobile devices, but also simplifies their design and frees up space for other components.

In some cases, it can be desirable to perform various administrative functions for eSIMs of an eUICC and/or for an eUICC's firmware so that the eUICC can provide new or enhanced services to a user of the mobile device that includes the eUICC. However, such administrative functions that change the eSIM and/or eUICC functionality can be quite risky, as hardware components can become permanently inoperable and/or the MNO can be subject to malware attacks when the administrative functions are not authorized and/or properly performed. This drawback is especially significant with respect to eUICCs as they are embedded within mobile devices and cannot be easily replaced when a firmware corruption occurs.

SUMMARY

Representative embodiments set forth herein disclose various techniques for user authentication and human intent verification of administrative operations of an eUICC included in a mobile device. In some embodiments, one or more administrative operations of a set of administrative operations for one or more eSIMs and/or for an eUICC's firmware of the eUICC of the mobile device can require user authentication, e.g., to verify a particular user, a set of users, or a user with administrative privileges, before execution of the one or more administrative operations can be performed for the eSIMs and/or for the eUICC of the mobile device. Representative administrative operations include operations that install, modify, delete, import, export, enable, and/or disable eSIMs for the eUICC of the mobile device. In some embodiments, certain administrative operations and/or certain eSIMs (which can include all eSIMs) and/or certain firmware updates of the eUICC can be identified to require additional user authentication and/or human intent verification. In some embodiments, a user of the mobile device provides information to link one or more external user accounts to one or more eSIMs. Representative external user accounts can include but are not limited to email accounts, such as Yahoo and/or Gmail, social website accounts, such as Facebook and/or Twitter, computing device accounts, such as an Apple ID account, and the like. In some embodiments, linking to an external user account occurs upon eSIM installation and/or subsequent to eSIM installation. In some embodiments, changes to links to external user accounts, e.g., substituting a different external user account for an existing external user account, occur for one or more existing eSIMs of the eUICC of the mobile device. In some embodiments, certain eSIM operations can require authentication of a user using credentials, such as a user name and password, (and/or information generated from such credentials) to authenticate the user with an external server, e.g., reachable via secure communication via wired and/or wireless links. In some embodiments, a secure token is generated and/or obtained at the mobile device and communicated to the external server, where the secure token includes user credential information, and the external server communicates with a third party server (e.g., maintained by a third party service such as Yahoo, Google, Facebook, Twitter, etc.) to authenticate the user based on the user credential information included in the secure token. In response to receipt from the external server of an indication that the user is authenticated, the administrative operations for the eSIM(s) and/or for the eUICC can be performed. In some embodiments, the administrative operations for the eSIM(s) and/or for the eUICC can require, separately and/or in addition to user authentication, a human intent verification, e.g., to confirm that one or more requested administrative operations are intended to be performed by a human user of the mobile device, e.g., to prevent malware, software bots, and/or remote hackers from interfering with the eSIM(s) and/or with the eUICC's functions of the eUICC of the mobile device. In some embodiments, human intent verification can include a secure input/output (I/O) means to obtain verifiable information that can be checked to determine that requested administrative operations for the eSIM and/or for the eUICC are intended by a human, including for example by a particular human. Representative I/O means include biometric sensors, e.g., a fingerprint scanner, iris detector, and/or camera face recognition, secure displays and/or secure keyboards, e.g., to request and accept passwords, personal identification number (PIN) codes, signatures, or the like, and human/machine differentiation software. The secure I/O can be coupled to a secure authentication solution, such as an embedded secure element (eSE) and/or a trusted execution environment (TEE) in the mobile device, used to verify, based on captured verifiable information, that a human and/or a particular human intends for one or more administrative operations are to be performed on one or more eSIMs and/or for the eUICC of the mobile device. The set of administrative operations, such as an eSIM's functions and/or an eUICC's local management functions, can be restricted to require human intent verification alone and/or in combination with user authentication via an external server, in some embodiments. In some embodiments, a set of one or more eSIMs and/or a set of administrative operations for one or more eSIMs can be exempt from human intent verification and/or user authentication. The exemption from checking for human intent verification and/or user authentication can apply under particular circumstances for a set of one or more eSIMs. Certain administrative operations, such as switching to an eSIM designated for a particular limited functionality, such as a provisioning eSIM used to acquire and/or install a regular eSIM can be exempt from verifying human intent and/or authenticating a user. Similarly switching to an eSIM used for emergency communication can also be exempt from human intent verification and/or user authentication. Switching from a provisioning eSIM and/or an emergency services eSIM to a regular eSIM, however, can still require human intent verification and/or user authentication.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1A:
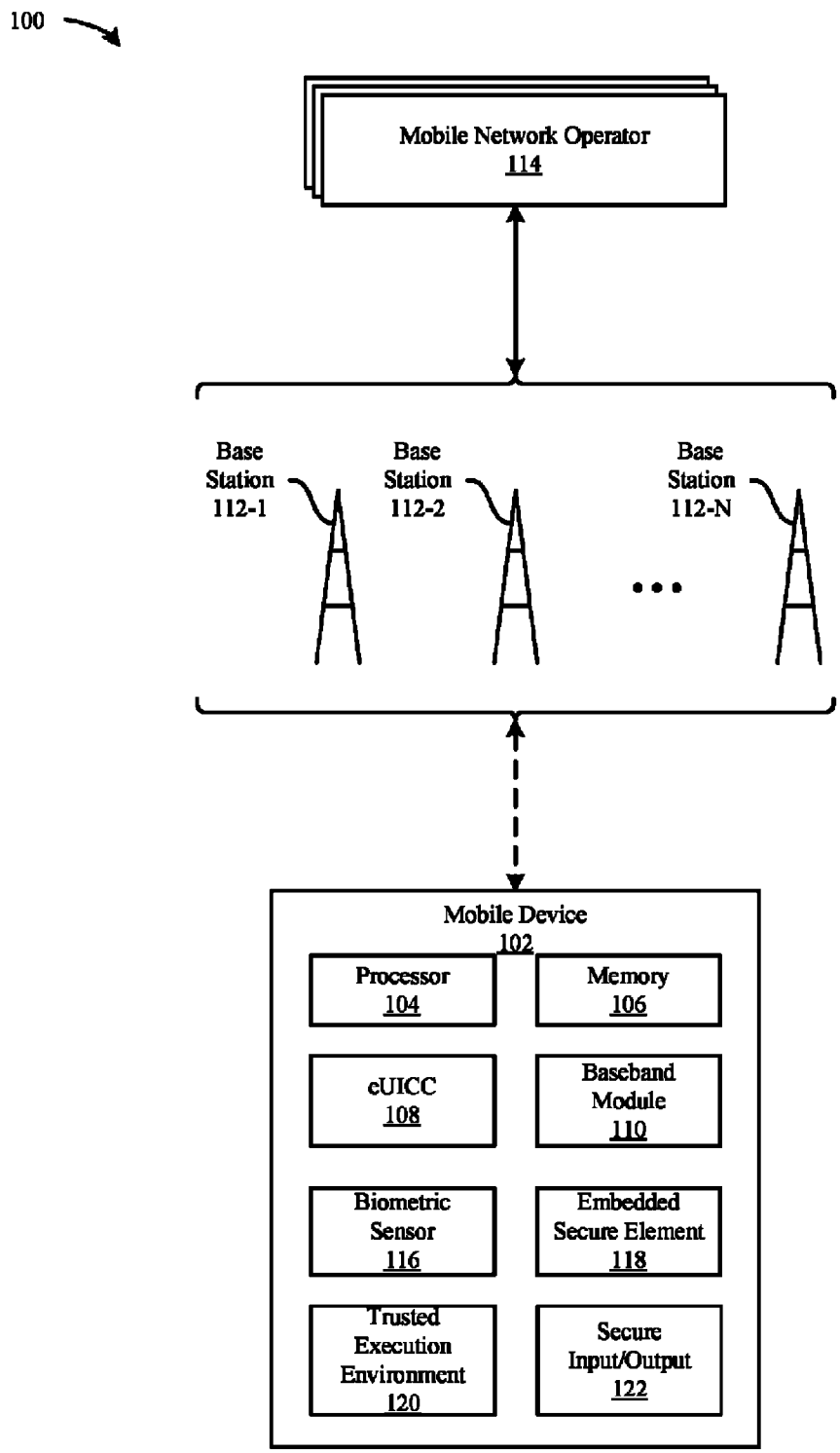
FIG. 1A illustrates a block diagram of different components of a system configured to implement various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments set forth herein provide various techniques for user authentication and human intent verification for administrative operations for eSIMs of an eUICC of a mobile device and/or for the eUICC directly. Certain administrative operations for eSIMs, such as import, install, modify, delete, and export, can be required to be authenticated to protect the eUICC and/or the eSIMs of the eUICC from malware attack or other malicious operations that can affect the proper operation of the mobile device and/or impact wireless networks managed by one or more mobile network operators via which the mobile device communicates. In some embodiments, authentication of a user, e.g., via user account credentials for a third party service, such as an Apple ID, Facebook, Yahoo, Gmail, Twitter, or other service account with which the user of the mobile device can be associated, are disclosed herein.

In some embodiments, in response to an import, addition, or installation of one or more eSIMs on the eUICC of the mobile device, a user of the mobile device can be prompted to associate one or more user accounts with which to authenticate the user, e.g., for the current administration operation and/or for future administrative operations for the one or more eSIMs. The user can be prompted, via a secure input/output of the mobile device, in some embodiments, to provide user credentials by which the user can be authenticated, e.g., user account information, a user account login ID, a password, a passcode, a signature, a fingerprint, an iris scan, a face scan, and the like. The mobile device can obtain an authentication token based on the user credentials, and the eUICC of the mobile device can generate a message, e.g., a signed payload, that can be sent to an external server, e.g., a level 3 (L3) server configured to manage eSIMs for the mobile device for one or more mobile network operators (MNOs). In some embodiments, the L3 server provides a one-time code (OTC), which serves as a temporary authentication token to prove that a user of the mobile device is authenticated during completion of the one or more administrative operations for the one or more eSIMs. The OTC can be communicated from the L3 server to the eUICC of the mobile device to verify user authentication without requiring additional communication with the L3 server for user authentication, at least while completing the one or more administrative operations for the one or more eSIMs. In some embodiments, the OTC is valid for a limited period of time and expires after the limited period of time. In some embodiments, the L3 server communicates with one or more third party servers to authenticate the user based at least in part on user credentials (or information derived therefrom) provided in the message.

In some embodiments, in response to initiation of an administrative operation for an eSIM with which user credentials are associated, the mobile device can obtain information regarding user authentication for the eSIM from the eUICC, e.g., an indication of an associated service, a third party server, the user credentials, information derived from the user credentials, etc., and the mobile device can prompt the user to enter all or a portion of the user credentials for the eSIM. In some embodiments, the user enters the credentials, whole or in part, via a secure input/output (I/O) of the mobile device. The mobile device can obtain a stored authentication token and/or use the user credentials to communicate a message to the L3 server, which in turn can communicate with a third party server to authenticate that the user is authorized to cause completion of the administrative operations for the eSIM. In response to receipt of an indication of successful authentication for the user from the L3 server, the mobile device can perform (and/or complete performance of) the administrative operation of the eSIM.

In some embodiments, a user of the mobile device can cause one or more administrative operations for eSIMs of an eUICC of the mobile device to be initiated by an external server, such as via the L3 server and/or via a third party server. In some embodiments, the user can initiate the eSIM administrative operations by entering user credentials via the L3 server and/or via the third party server, and the L3 server can provide a message, e.g., an authentication token, to the eUICC of the mobile device. As a result of proof of user authentication, e.g., based on the authentication token provided to the eUICC of the mobile device, the eSIM administrative operation can be performed at the eUICC of the mobile device.

In some embodiments, a biometric sensor can be used to determine a particular user and/or to verify human intent to perform one or more administrative operations for the eSIM of the eUICC of the mobile device. In some embodiments, the biometric sensor is coupled with an embedded secure element that stores information by which the user can be authenticated and/or by which human intent verification can be determined. In some embodiments, the embedded secure element stores a key and/or a certificate tied to the eUICC of the mobile device, such as including a particular chip identification number of the eUICC within the key and/or the certificate. In some embodiments, a particular user is required to be identified to perform certain administrative operations, e.g., to delete or export an eSIM from an eUICC of the mobile device.

In some embodiments, the mobile device includes an embedded secure element and/or a trusted execution environment coupled with the eUICC in order to provide for user authentication and/or for human intent verification to perform (and/or to complete performance of) certain administrative operations for one or more eSIMs of the eUICC of the mobile device. In some embodiments, the eUICC of the mobile device provides for user authentication using an external server (such as the L3 server alone or in combination with another third party server). In some embodiments, the embedded secure element and/or the trusted execution environment perform mutual authentication with the eUICC using secure communication, such as with shared secrets, symmetric keys, etc. In some embodiments, the embedded secure element and/or the trusted execution environment use the same protocol for mutual authentication with each other as used between the eUICC and an external server, such as used with an L3 server that manages one or more eSIMs of the eUICC of the mobile device. In some embodiments, the eUICC and the embedded secure element are paired with symmetric keys and/or certificates during manufacture of the mobile device. In some embodiments, the eUICC and the embedded secure element and/or the trusted execution environment are paired with symmetric keys and/or certificates after manufacture of the mobile device, such as using verification via an external L3 sever and key/certificate injection to the mobile device.

In some embodiments, a set of one or more eSIMs and/or a set of one or more administrative operations for one or more eSIMs can be not subject to human intent verification and/or user authentication. Certain eSIMs can provide limited, specialized functionality that does not require additional human intent verification and/or user authentication, and in some embodiments, switching to, installing, enabling and/or activating one of these eSIMs can be exempt from checking for human intent and/or a particular user's authority to use the eSIM. A provisioning eSIM that provides for communication via a wireless network (and/or via a wired network) to install, enable, and/or activate a regular eSIM can be exempt from human intent verification and/or user authentication for certain administrative eSIM operations, such as when switching to, installing, enabling, and/or activating the provisioning eSIM. Similarly an emergency communication eSIM, or another eSIM for which a limited functionality is provided for communication in certain circumstances, can also be exempt from human intent verification and/or user authentication when switching to, installing, enabling, and/or activating the emergency services eSIM. When switching from a provisioning eSIM or an emergency services eSIM to a regular eSIM, however, human intent verficiation and/or user authentication can be required in some embodiments. The foregoing techniques are described below in greater detail in conjunction with FIGS. 1A to 11.

In accordance with various embodiments described herein, the terms wireless communication device, wireless device, mobile device, mobile station, and user equipment (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as mobile devices, wireless mobile devices, stations, client wireless devices, or client wireless communication devices, interconnected to an access point (AP), e.g., as part of a WLAN, and/or to each other, e.g., as part of a WPAN and/or an ad hoc wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

FIG. 1A illustrates a block diagram of different components of a system 100 that is configured to implement various techniques described herein, according to some embodiments. More specifically, FIG. 1A illustrates a high-level overview of the system 100, which, as shown, includes a mobile device 102 and a group of base stations 112 that are managed by different MNOs 114. According the illustration of FIG. 1A, the mobile device 102 can represent a mobile computing device (e.g., an iPhone® or an iPad® by Apple®), the base stations 112 can represent different radio towers that are configured to communicate with the mobile device 102, and the MNOs 114 can represent different wireless service providers that provide specific services (e.g., voice, data, messaging, etc.) to which the mobile device 102 can be subscribed. Moreover, and as described in greater detail below, one or more servers (not illustrated explicitly) can be configured to communicate with the mobile device 102 and to provide one or more eSIMs and/or eUICC firmware/software to the mobile device 102 in a secure manner.

As shown in FIG. 1A, the mobile device 102 can include a processor 104, a memory 106, an eUICC 108, and a baseband module 110. These components work in conjunction to enable the mobile device 102 to provide useful features to a user of the mobile device 102, such as localized computing, location based services, and Internet connectivity. As described in greater detail below, the eUICC 108 can be configured to store multiple eSIMs for accessing different MNOs 114 through the base stations 112. For example, the eUICC 108 can be configured to store one or more eSIMs for each MNO 114 to which mobile device 102 is subscribed. As also described in greater detail below, the mobile device 102—specifically, the eUICC 108 included in the mobile device 102—can be configured to perform administrative operations for one or more eSIMs of the eUICC 108 and to receive and process eUICC firmware, in accordance with the various techniques set forth herein. In some embodiments, the mobile device 102 can be configured to perform user authentication and/or human intent verification associated with one or more administrative operations for eSIMs of and/or firmware changes for the eUICC 108, e.g., via one or more external servers. In some embodiments, user authentication can include use of a biometric sensor 116 and/or an embedded secure element (eSE) 118 and/or a trusted execution environment (TEE) 120 and/or a secure input/output 122, e.g., to obtain user credentials and/or associated information by which a user of the mobile device, a particular user, a set of users, and/or an administrative user authorized to perform certain administrative operations. In some embodiments, user authentication is performed solely at the mobile device 102 (e.g., based on hardware/software in the mobile device 102). In some embodiments, user authentication includes communication via a wireless (and/or wireline) connection to determine whether certain administrative functions should be performed. In some embodiments, the biometric sensor 116, the eSE 118, the TEE 120, and/or the secure I/O 122 can be used to determine that a human, e.g., rather than a machine, intends for execution of one or more administrative functions on the mobile device 102, e.g., to add, install, import, enable, modify, update, delete, disable, and/or export an eSIM for the eUICC 108 of the mobile device 102.

As shown in FIG. 1A, the mobile device 102 can include a biometric sensor 116 to perform authentication techniques that establish, at least to a reliable degree, whether or not a human is operating the mobile device 102 and/or requesting performance of one or more administrative operations. For example, the biometric sensor 116 can be configured to authenticate a user through signature dynamics, which involves prompting a user to provide a signature (e.g., using a stylus) and gathering information (e.g., pressure and writing speed) as the signature is provided. The biometric sensor 116 can also be configured to authenticate a user through typing patterns, which involves prompting a user to input a sequence of words (e.g., using a keyboard) and gathering information (e.g., typing rate, typing patterns, etc.)

as the words are input. The biometric sensor 116 can also be configured to authenticate a user through fingerprint recognition, which involves prompting a user to provide his or her fingerprint (e.g., using a fingerprint scanner) and gathering information (e.g., a detailed image) about the fingerprint. The biometric sensor 116 can further be configured to authenticate a user through voice recognition, facial recognition, hand and/or palm geometry, eye scans, and the like. It is noted that the biometric sensor 116 is not limited to implementing the foregoing approaches, and that any approach for authenticating a human is within the scope of the embodiments described herein. In some embodiments, in addition to and/or in place of the biometric sensor 116, user authentication and/or human intent verification can use the secure I/O 122 can be used to gather information by which the authentication and/or verification can be performed.

Different levels of authentication can be required when attempting to establish whether a human is operating the mobile device 102 and/or requesting performance of one or more administrative operations. For example, a basic level of authentication can involve establishing whether a human is operating the mobile device 102 (e.g., through a provision of a fingerprint) without requiring the human to be specifically known to the mobile device 102. In another example, an intermediate level of authentication can involve establishing, through an issuance of an authentication challenge, whether a human operating the mobile device 102 is specifically known to the mobile device 102. This can involve, for example, prompting the human to provide his or her fingerprint, collecting information associated with the fingerprint, and then comparing the information to previously-stored information managed by the mobile device 102. In yet another example, an advanced level of authentication can involve establishing, through an issuance of multiple authentication challenges (e.g., a fingerprint recognition and a voice recognition), whether the mobile device 102 specifically knows a human that operates the mobile device 102. It is noted that these techniques can also include verifying that a human is a part of a group of humans that are authorized and known to the mobile device 102. In some embodiments, information received by the biometric sensor 116 and/or the secure I/O 122 can be processed in conjunction with information stored in the eSE 118 and/or via the TEE 120 and/or via one or more external servers.

Figure 1B:
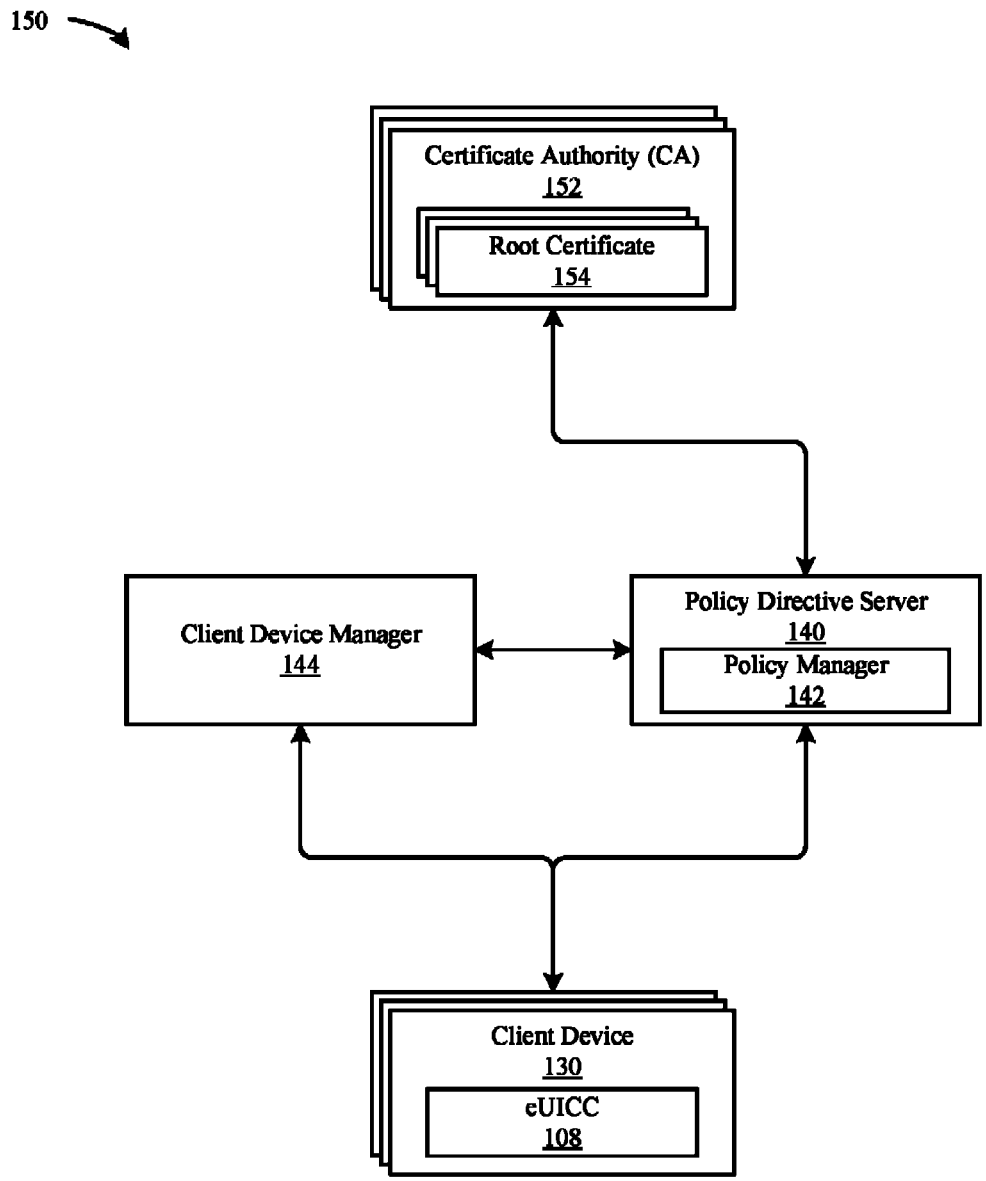
FIG. 1B illustrates another block diagram of different components of a system configured to implement various techniques described herein, according to some embodiments.

FIG. 1B illustrates another block diagram of different components of a system 150 configured to implement various techniques described herein, according to some embodiments. FIG. 1B illustrates a high-level overview of the system 150, which, as shown, includes certificate authorities 152, a policy directive server 140, a client device manager 144, and one or more client devices 130, which include mobile devices 102 as shown in FIG. 1A. Each certificate authority 152 can self-sign root certificates 154 that are distributed to and trusted by the client devices 130. In particular, the root certificates 154 can be used by the client devices 130 for verifying intermediate certificates (and correlated signatures) that are signed based on the root certificates 154 and presented to the client devices 130 for authentication purposes. More specifically, the client devices 130 can be configured to receive and process commands that are signed based on the one or more of the aforementioned certificates, where the client devices 130 rely on the root certificates 154 to authenticate the commands prior to processing them.

In some embodiments, the client device manager 144 represents a particular entity that is configured to manage the client devices 130, e.g., the client device manager 144 can be responsible for issuing firmware and software updates to the client devices 130, including for example the installation, modification, and/or deletion of eSIMs and/or eUICC firmware/software for the eUICC 108 of the client device(s) 130. As shown in FIG. 1B, the client device manager 144 interfaces with the policy directive server 140, which executes a policy manager 142 that is configured to generate and issue the aforementioned eSIMs and/or eUICC firmware/software to the client devices 130. The policy manager 142 can be configured to maintain records that indicate how different root certificates 154 are distributed across the client devices 130. In this manner, when a root certificate 154 is compromised and needs to be revoked, the policy manager 142 can identify one or more client devices 130 that store the root certificate 154 and issue a revocation message that causes the one or more client devices 130 to permanently disregard the root certificate 154.

As shown in FIG. 1B, each client device 130 includes an eUICC 108 embedded within a main system board of the client device 130. The eUICC 108 can be configured as a sandboxed hardware/software environment that cannot be directly accessed by external entities, such as by a main operating system (OS) that executes on the client device 130. Although not illustrated in FIG. 1B, the eUICC 108 can include a microprocessor and a storage device (e.g., a ROM) that work in conjunction to process different commands and carry out user authentication and/or human intent verification in combination with additional firmware/software/hardware as shown in FIG. 1A and described further herein, e.g., where the storage device is configured to store one or more root certificates 154 for the client device 130.

Figure 2:
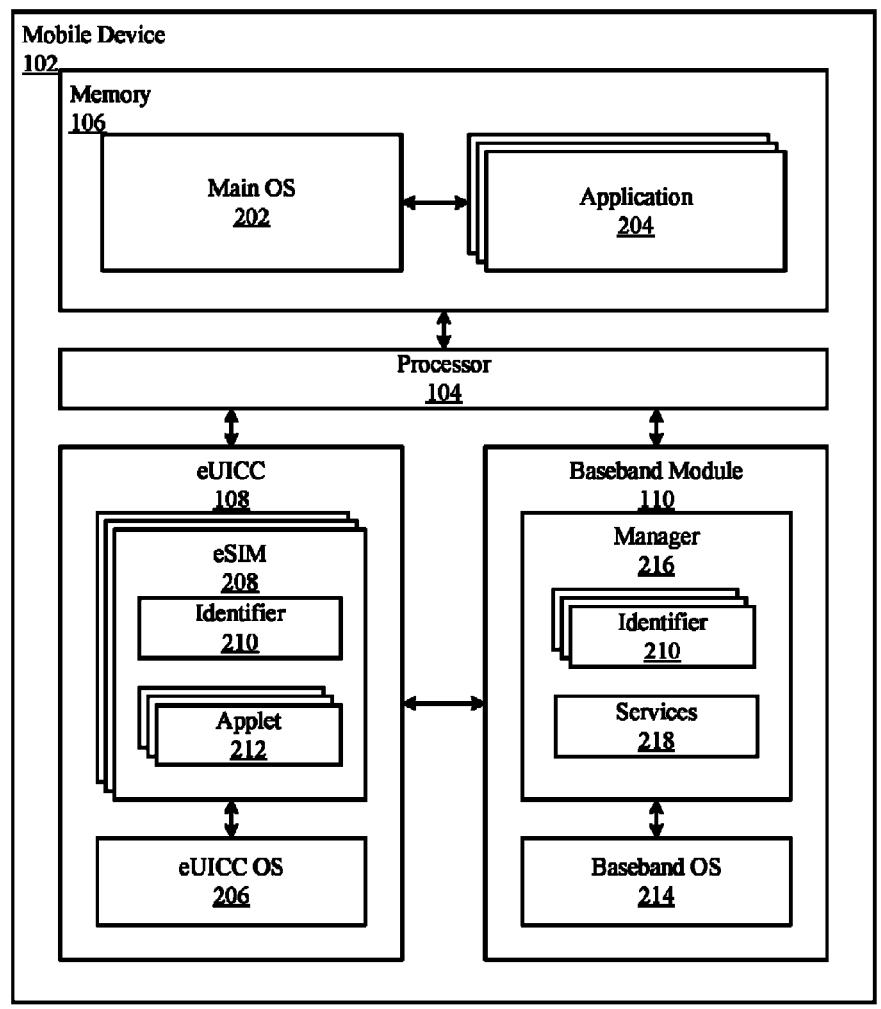
FIG. 2 illustrates a block diagram of a more detailed view of particular components of the systems of FIGS. 1A and 1B, according to some embodiments.

FIG. 2 illustrates a block diagram of a more detailed view 200 of particular components of the mobile device 102 of FIG. 1A, according to some embodiments. As shown in FIG. 2, the processor 104, in conjunction with the memory 106, can implement a main operating system (OS) 202 that is configured to execute applications (e.g., native OS applications and user applications). In some embodiments, the main OS 202 can be configured to execute one or more applications 204, e.g., to facilitate administrative operations for eSIMs 208 and/or firmware of the eUICC 108. As shown in FIG. 2, the eUICC 108 can be configured to implement an eUICC OS 206 that is configured to manage hardware resources of the eUICC 108 (e.g., a processor, a random access memory (RAM), and a non-volatile memory, which are not explicitly illustrated in FIG. 2). The eUICC OS 206 can also be configured to manage eSIMs 208 that are stored by the eUICC 108, e.g., by activating, deactivating, and/or modifying eSIMs 208 within the eUICC 108 and providing the baseband module 110 with access to the eSIMs 208. As shown in FIG. 2, each eSIM 208 can be associated with a unique identifier 210 and can include multiple applets 212 that define the manner in which the eSIM 208 operates. For example, one or more of the applets 212, when implemented by the baseband module 110 and the eUICC 108, can be configured to enable the mobile device 102 to communicate with an MNO 114 to activate features (e.g., phone calls and Internet access) of the mobile device 102.

As also shown in FIG. 2, the baseband module 110 of the mobile device 102 can include a baseband OS 214 that is configured to manage hardware resources of the baseband module 110 (e.g., a processor, a memory, different radio components, etc., which are not explicitly shown in FIG. 2). In some embodiments, the baseband module 110 can implement a manager 216 that is configured to interface with the eUICC 108 to implement various techniques described herein, which include exchanging eSIM capability information with the eUICC OS 206 and managing unique identifiers 210 of the eUICC 108 when the eUICC 108 manages two or more eSIMs 208. As also shown in FIG. 2, the manager 216 can be configured to implement services 218, which represents a collection of software modules that can be instantiated by way of various applets 212 of activated eSIMs 208 that are included in the eUICC 108. For example, services 218 can be configured to manage different connections between the mobile device 102 and MNOs 114 according to different eSIMs 208 that are activated.

Figure 3:
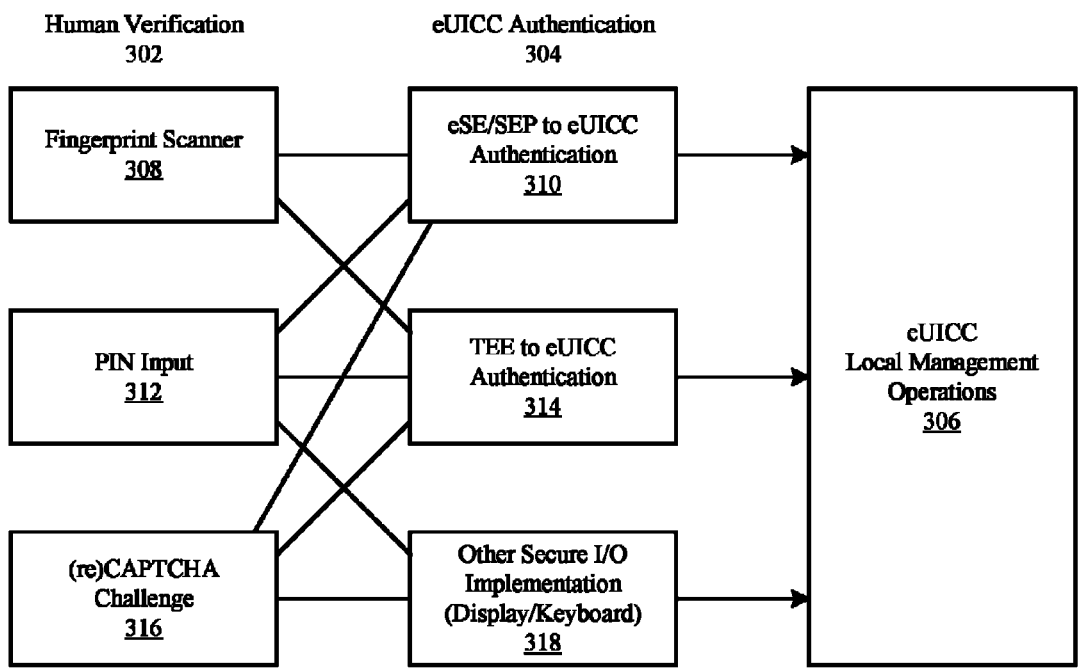
FIG. 3 illustrates a block diagram of a framework of components for human intent verification and/or user authentication included in a mobile device, according to some embodiments.

FIG. 3 illustrates a block diagram 300 of a framework of components for human intent verification and/or user authentication included in a mobile device 102, according to some embodiments. Local management of eSIMs 208 of a mobile device 102, where the eSIMs 208 provide authorization and/or authentication for access to services of wireless networks for MNOs 114, can be the target of an attack by malware installed surreptitiously on the mobile device 102 and/or via a remote hacker. Certain administrative operations for the eSIMs 208 can be vulnerable to improper execution, which can affect operation of the mobile device 102 and/or the wireless network of the MNO 114. For example, malware may attempt to switch one or more eSIMs 208 in use by the mobile device 102, without the user of the mobile device 102 being aware of the switch. In some cases, local switching of eSIMs 208 of the mobile device 102 can lead to frequent wireless network attachments (establishing and disestablishing connections), which can overload control signaling for a radio access network through which the mobile device 102 connects to wireless services. In addition, backend servers of the wireless network can be overloaded by improper switching of eSIMs 208 of the mobile device 102. Furthermore, traditionally, MNOs 114 leverage control of access to services and switching between services for users of a mobile device 102 based on controlling the manufacture and distribution of physical SIMs and would like to continue to ensure service continuity and control as eSIMs 208 are implemented in mobile devices 102. Local deletion of eSIMs 208 (which can also be referred to as profiles and/or eSIM profiles in some embodiments) by malware can result in irreversible damage to operation of the eUICC 108 and/or the mobile device 102, at least for access to wireless services that use the eSIMs 208. Information included in eSIMs 208 can also be subject to improper access by malware that can lead to privacy concerns for users of the mobile device 102. In view of these concerns, for both business reasons and security reasons, additional layers of user authentication and/or human intent verification can be needed in order to confirm authority to perform one or more administrative operations that can affect one or more eSIMs 208 and/or the eUICC 108 of the mobile device 102.

The mobile device 102 can include one or more means for human verification 302, such as a biometric sensor 116 (a representative example of which can include a fingerprint scanner 308), a personal identification number (PIN) input 312 (or other password and/or user identity verification input), and a Completely Automated Public Turing test to tell Computers and Humans Apart (CAPTCHA) or reCAPTCHA implementation of a reverse Turing test to verify a human operates the mobile device 102. Each of these human verification 302 means can provide varying levels of security to verify whether a human (rather than a software/hardware/firmware module of the mobile device 102) intends for a particular administrative operation (or set of administrative operations) to be performed, such as affecting one or more eSIMs 208 and/or the eUICC 108 of the mobile device 102. Each of the human verification 302 means can connect with one or more versions of a middle layer platform security solution that provides an eUICC authentication 304 means to verify that a human (and/or a particular user) intends for one or more administrative operations of the eSIMs 208 and/or the eUICC 108 of the mobile device 102 to be executed. For example, the eUICC authentication 304 means can include a hardware-based embedded Secure Element (eSE) 118 (which can also be referred to as a Secure Enclave Processor or SEP, in some embodiments) that includes a secure connection to one or more of the human verification 302 means and a secure connection to the eUICC 108 of the mobile device 102. The eSE 118, in combination with the human verification 302 means and the eUICC 108, can provide a trusted and secure hardware/software combination for authentication of a user and/or a human, where the authentication function realized by this combination of hardware and software is indicated in FIG. 3 as the eSE/SEP to eUICC Authentication 310 block.

As a representative example, before performing one or more administrative operations that can impact one or more eSIMs 208 and/or the eUICC 108, the mobile device 102 can require human verification, such as entry of a PIN via the PIN input 312 and/or a fingerprint via the fingerprint scanner 308 (or another biometric input via the biometric sensor 116) to verify that a human and/or a particular user operates the mobile device 102. When the human verification input is authenticated, e.g., by the eUICC authentication 304 means, execution of the requested administrative operations, which are illustrated as the eUICC local management operations for the eUICC 108 can be performed. In some embodiments, the eUICC 108 can provide authentication via one or more external servers, e.g., for off-card authentication based on one or more digital credentials (such as keys, certificates, and the like). In some embodiments, different security levels of human verification 302 can be used for different administrative operations and/or based on a security level configuration for the mobile device 102 (and/or for eSIMs 208 of the eUICC 108 of the mobile device 102, such as required by various MNOs 114, which can be specified in various policies as described for FIG. 1B). As illustrated in FIG. 3, human intent verification and/or user authentication can use trusted components to bridge between human verification locally at the mobile device 102 and eUICC authentication, which can involve external server verification in addition to local verification.

In some embodiments, a Trusted Execution Environment (TEE) 120 can be linked to one or more human verification 302 means, such as the fingerprint scanner 308 (and/or another biometric sensor 116), the PIN input 312 (and/or other user credential I/O verification), and/or the (re)CAPTCHA challenge 316 block. The TEE 120, in some embodiments, can provide a virtual secure element analogous to the hardware-based eSE 118. Ongoing standardization efforts, such as a GlobalPlatform (GP) Secure Channel Protocol (SCP), e.g., GP SCP11, specify architectures to allow for mutual authentication between the TEE 120 and the eUICC 108, which in some embodiments can be based on Public Key Infrastructure (PKI) certificates. The TEE to eUICC authentication 314 block can provide an alternative and/or a supplemental means to join eUICC authentication 304 with human verification 302 to authenticate/verify administrative operations for eSIMs 208 and/or for the eUICC 108 before allowing execution of the administrative operations to be performed.

In some embodiments, a Secure I/O 122 can be linked with human verification 302 means, such as PIN input 312, (re)CAPTCHA challenge 316, and/or other user credential inputs, e.g., gathered via a secure I/O implementation 318 such as a secure display/keyboard, to provide an additional means for secure I/O on the mobile device 102. In some embodiments, the secure I/O 122 can be integrated with secure software of the main OS 202 executing on the processor 104 of the mobile device 102. The secure I/O 122 can be used in place of a normal I/O mechanism in order to ensure that malware does not intercept and/or imitate human verification inputs to be used in conjunction with the eUICC authentication 304 to control execution of one or more administrative operations for the eSIMs 208 and/or for the eUICC 108. While the block diagram 300 of FIG. 3 provides representative means for performing human verification and eUICC authentication, additional means can also be used in place of and/or in conjunction with those described herein to provide for secure input. The additional means can include, for example, human vs. machine differentiation, secure communication channels, trusted relationships between hardware/software modules, and security exchanges with external servers to protect against malware when execution of one or more administrative operations that impact the eSIMs 208 and/or the eUICC 108 is requested.

Figure 4:
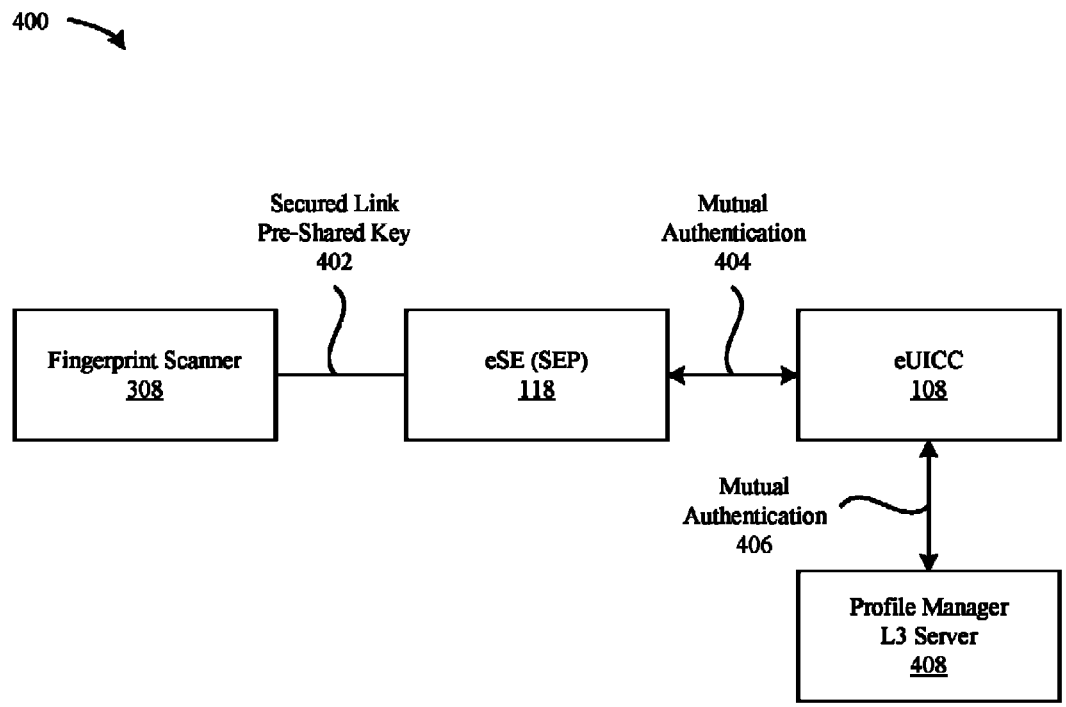
FIG. 4 illustrates a block diagram of a representative configuration of components for verification and/or authentication using a biometric sensor in a mobile device, according to some embodiments.

FIG. 4 illustrates a block diagram 400 of a representative configuration of components for verification and/or authentication using a biometric sensor 116, such as a fingerprint scanner 308, in a mobile device 102, according to some embodiments. The fingerprint scanner 308 can be paired with an embedded secure element (eSE) 118 or secure enclave processor (SEP) through a secured link 402 that uses a pre-shared key, e.g., which can be effected at the time of manufacture of the mobile device 102. The secured link 402 can provide a means for end-to-end (E2E) security between the fingerprint scanner 308 and the eSE 118, typically using a symmetric key pairing. Biometric user credentials, such as fingerprint information gathered via the fingerprint scanner 308, can be protected against malware, as verification of the biometric user credentials can occur within the trusted hardware (such as the eSE 118) accessible only via the secured link 402. The eSE 118 can in turn pair securely with the eUICC 108 to provide mutual authentication between the eSE 118 and the eUICC 108. In some embodiments, during manufacture of the mobile device 102, the eSE 118 and the eUICC 108 can be paired with a symmetric key and/or a certificate, so that the mutual authentication 404 between the eSE 118 and the eUICC 108 is secure when the mobile device 102 is configured and put into use by the user. In some embodiments, the mutual authentication 404 mechanism between the eSE 118 and the eUICC 108 can use the same protocol as the mutual authentication 406 mechanism between the eUICC 108 and an external server, such as the Profile Manager L3 server 408. In some embodiments, after the mobile device 102 is manufactured, credentials for pairing the eSE 118 and the eUICC 108 can be obtained and verified using one or more servers, such as the L3 server 408, e.g., the credentials can include symmetric keys and/or certificates provided for the eSE 118 and the eUICC 108 in conjunction with the verification by the one or more servers. The combination of the fingerprint scanner 308, the eSE 118, and the eUICC 108 provides a local (to the mobile device 102) platform level of security, which can additionally be supplemented with remote security, e.g., via the combination of the eUICC 108 and one or more external servers, such as the Level 3 (L3) profile manager server 408, which in turn can also be in communication with additional third party servers.

Figure 5A:
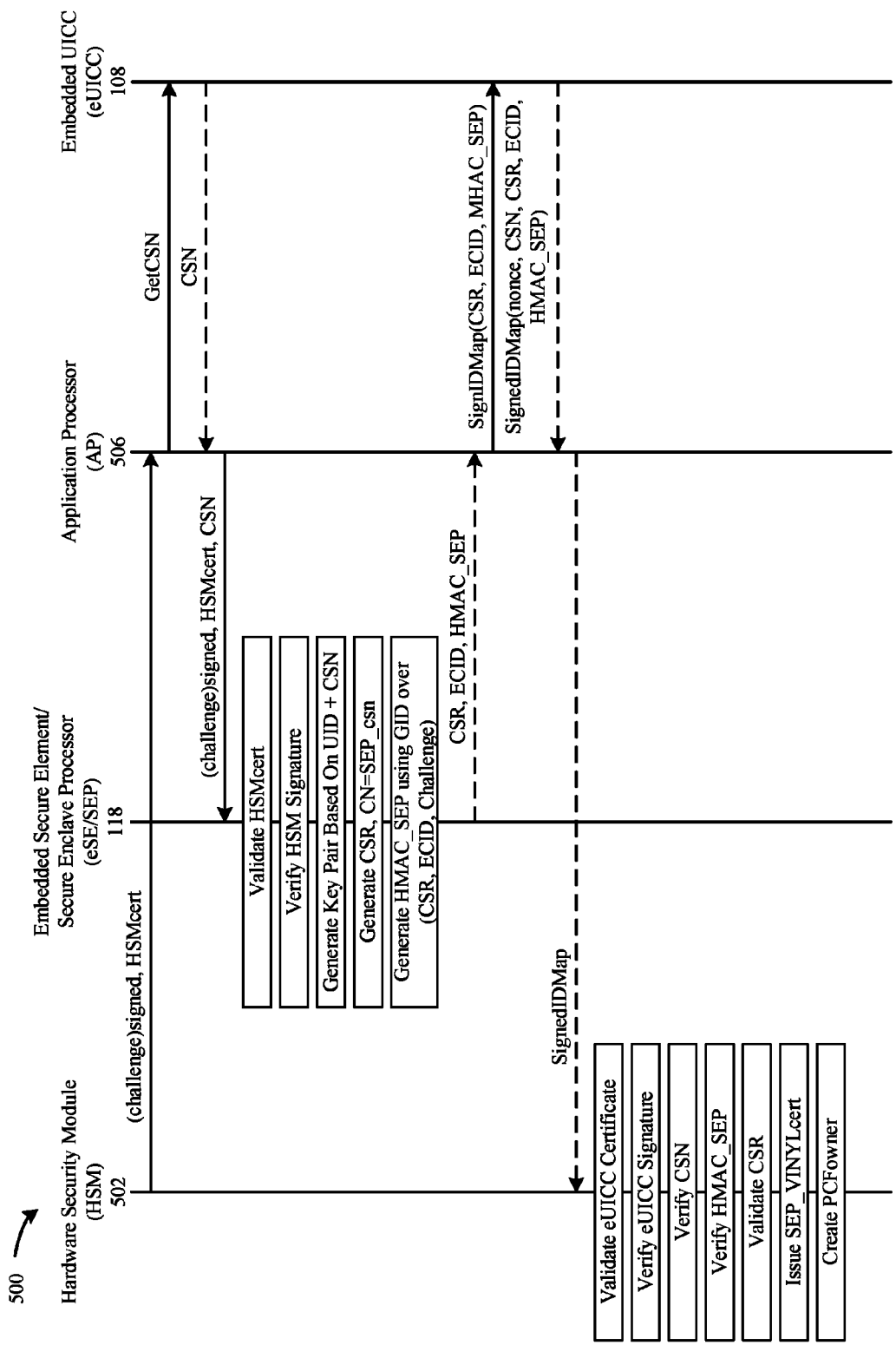
FIGS. 5A and 5B illustrate a sequence diagram for pairing an embedded secure element with an eUICC in a mobile device, according to some embodiments.
Figure 5B:
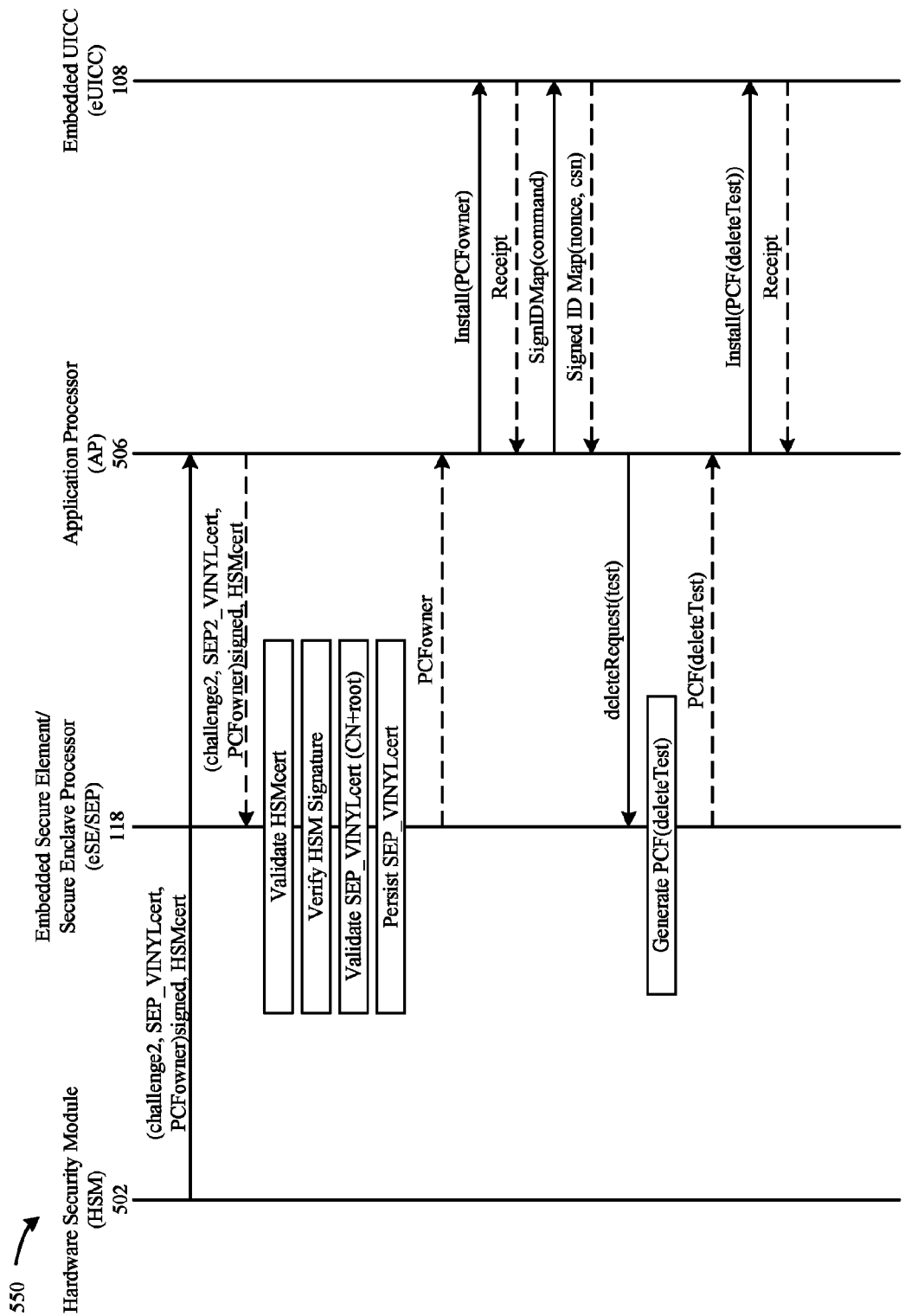

FIGS. 5A and 5B illustrate a sequence diagram 500/550 for pairing an embedded secure element, e.g., the eSE 118, with the eUICC 108 in a mobile device 102, according to some embodiments. The mobile device 102 can include an application processor (AP) 506, which can correspond in some embodiments to the processor 104. The sequence diagram 500/550 illustrates a representative embodiment in which a secure pairing between the eSE 118 and the eUICC 108 can occur after manufacture of the mobile device 102. A trusted remote server, labeled as a Hardware Security Module (HSM) 502 in FIG. 5A, can assist in establishing the trust relationship between the eSE 118 and the eUICC 108 of the mobile device 102. The HSM 502 can maintain Policy Control Function (PCF) certificates, one or more of which can be provided from the HSM 502 to the AP 506 of the mobile device 102. In some embodiments, the HSM certificate (HSMcert) can be obtained from the HSM 502 by the AP 506 with a signed Challenge. The AP 506 can retrieve a Card Serial Number (CSN) from the eUICC 108 and provide the signed challenge, the HSM certificate, and the CSN to the eSE 118. The eSE 118 can validate the HSM certificate, verify the HSM signature, and subsequently generate a key pair based on a unique identifier (UID) for the mobile device 102 and the CSN. The eSE 118 can generate a certificate signing request (CSR) and a common name (CN), which can be associated with the eSE 118 and the CSN combination. The eSE 118 can also generate a hash (labeled as $HMAC_{13}$ SEP in FIG. 5A) based on a group identifier (GID), the CSR, an exclusive chip identifier (ECID), and the challenge. The CSR, ECID, and $HMAC_{13}$ SEP can be communicated to the AP 506, which can generate a signed identity map based on the information and send the signed identity map to the eUICC 108. In turn, the eUICC 108 can return to the AP 506 the signed identity map with a nonce added thereto. The signed identity map can be communicated to the HSM 502 (e.g., to an external server with which the eUICC 108 of the mobile device 102 can have a previously established trusted relationship). The HSM 502 can validate the eUICC certificate, verify the eUICC signature, verify the CSN, verify the hash (HSM_SEP), validate the CSR, and issue a certificate (when successful verification and validation occurs) for the eSE 118 (the certificate labeled as SEP_VINYLcert in FIG. 5A). The HSM 502 can create a PCF owner certificate for the eSE 118. The HSM 502 can provide a signed combination of a second challenge (labeled as challenge2 in FIG. 5B), the certificate for the eSE 118, and the PCF owner certificate, with the HSM certificate to the AP 506 of the mobile device 102, and the AP 506 can forward the information received form the HSM 502 to the eSE 118. The eSE 118 can validate the HSM certificate, verify the HSM signature, validate the eSE certificate and store the eSE certificate. The eSE 118 can communicate the PCF owner certificate to the AP 506, which can forward the PCF owner certificate to the eUICC 108 for installation at the eUICC 108, which can in turn indicate receipt of the PCF owner certificate back to the AP 506. The AP 506 can send a SignIDMap(command) to the eUICC 108, which can respond with a Signed ID Map including a nonce and the CSN. With the eSE certificate at the eSE 118 and the PCF owner certificate installed in the eUICC 108, a trusted relationship between the eSE 118 and the eUICC 108 can be established.

From the point of view of the eUICC 108, establishing the trusted relationship between the eUICC 108 and the eSE 118 resembles adding a trusted relationship for the eUICC 108 with a new trusted server, which can be external to the mobile device 102 (although, in this case, the new trusted server, i.e., the eSE 118, is actually internal (local) to the mobile device 102). The pairing of the eSE 118 with the eUICC 108 can depend on installation of the PCF owner certificate, which can be based on Public Key Infrastructure (PKI) certificates. Secure communication between the eSE 118 and the eUICC 108 after installation of the PCF owner certificate can be based on authenticated Level 3 (L3) commands. In some embodiments, the establishment of the trusted relationship (and/or subsequent secure communication) between the eSE 118 and the eUICC 108 can be extended to include installation of symmetric key(s) to be used as L3 credentials when a symmetric key based L3 security protocol is used, e.g., as described in GP SCP03 and GP SCP80. In some embodiments, additional mechanisms can be used to generate symmetric keys after installation of a certificate in accordance with symmetric key based secure channel protocols in development, e.g., GP SCP11.

Figure 6:
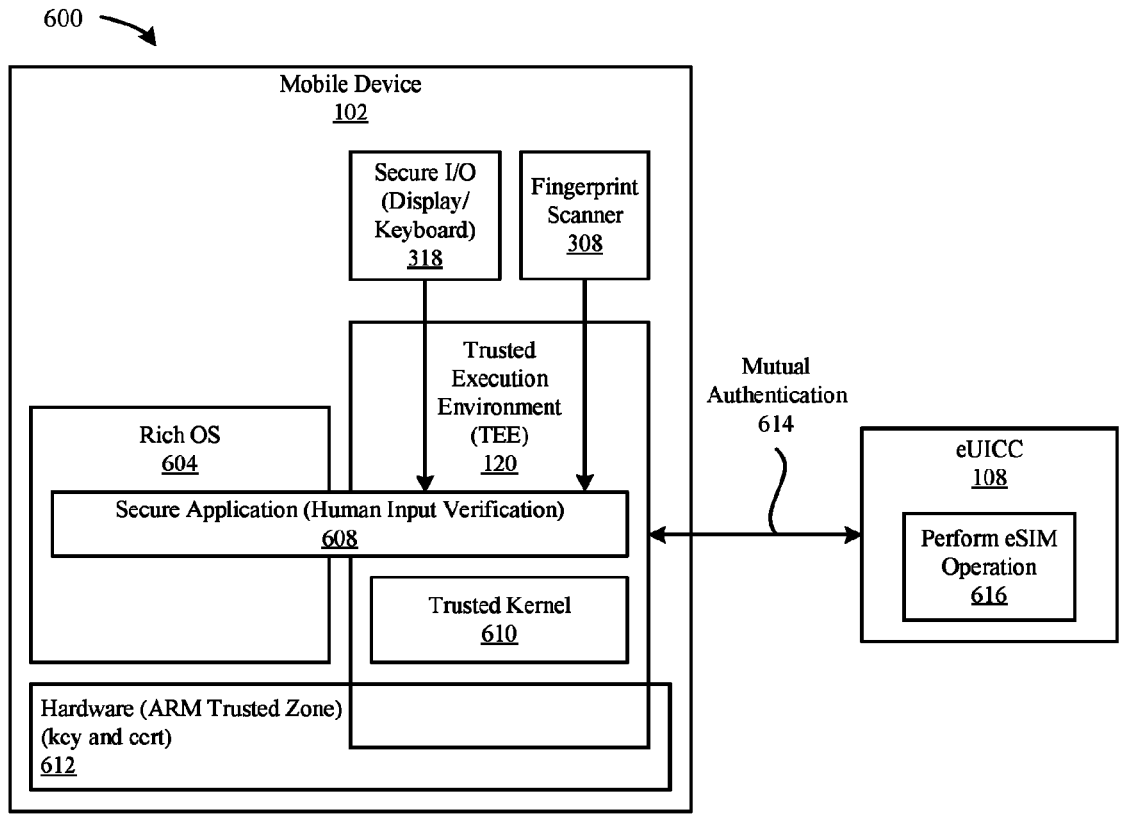
FIG. 6 illustrates a block diagram of a representative configuration of components for verification and/or authentication using a trusted execution environment (TEE) in a mobile device, according to some embodiments.
Figure 7A:
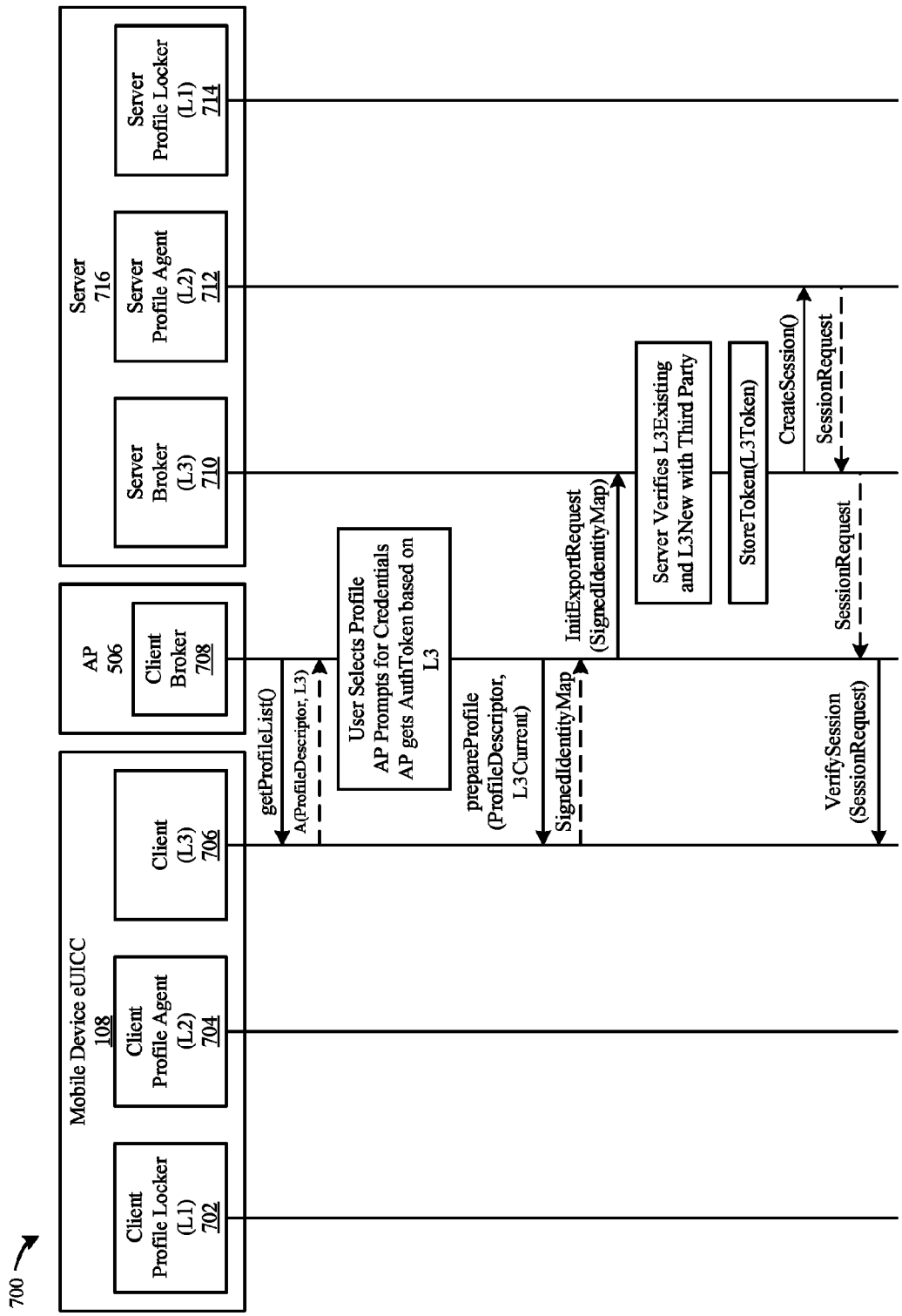
FIGS. 7A to 7D illustrate a sequence diagram for exporting an eSIM with user authentication via an external server by a mobile device, according to some embodiments.
Figure 7B:
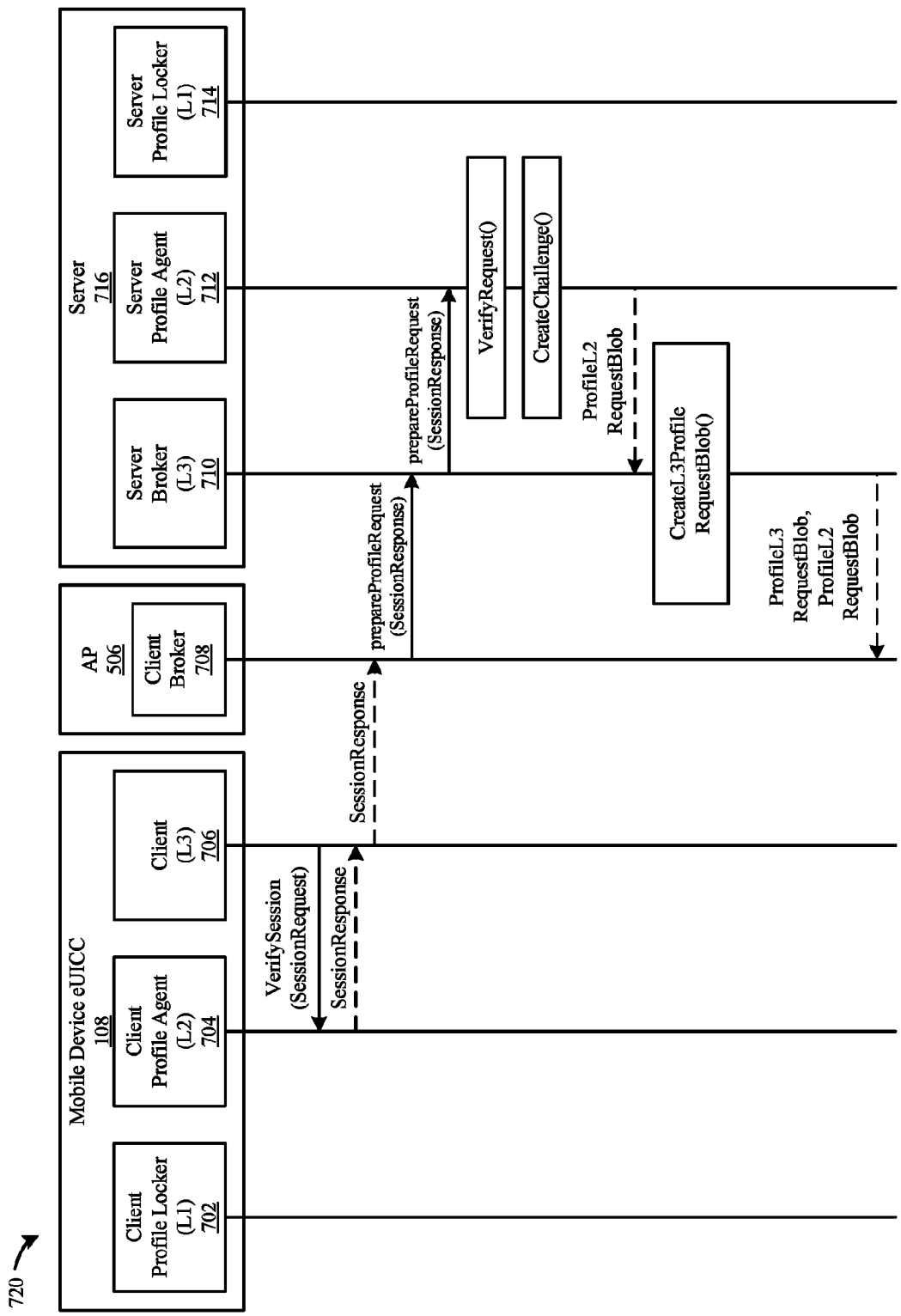
Figure 7C:
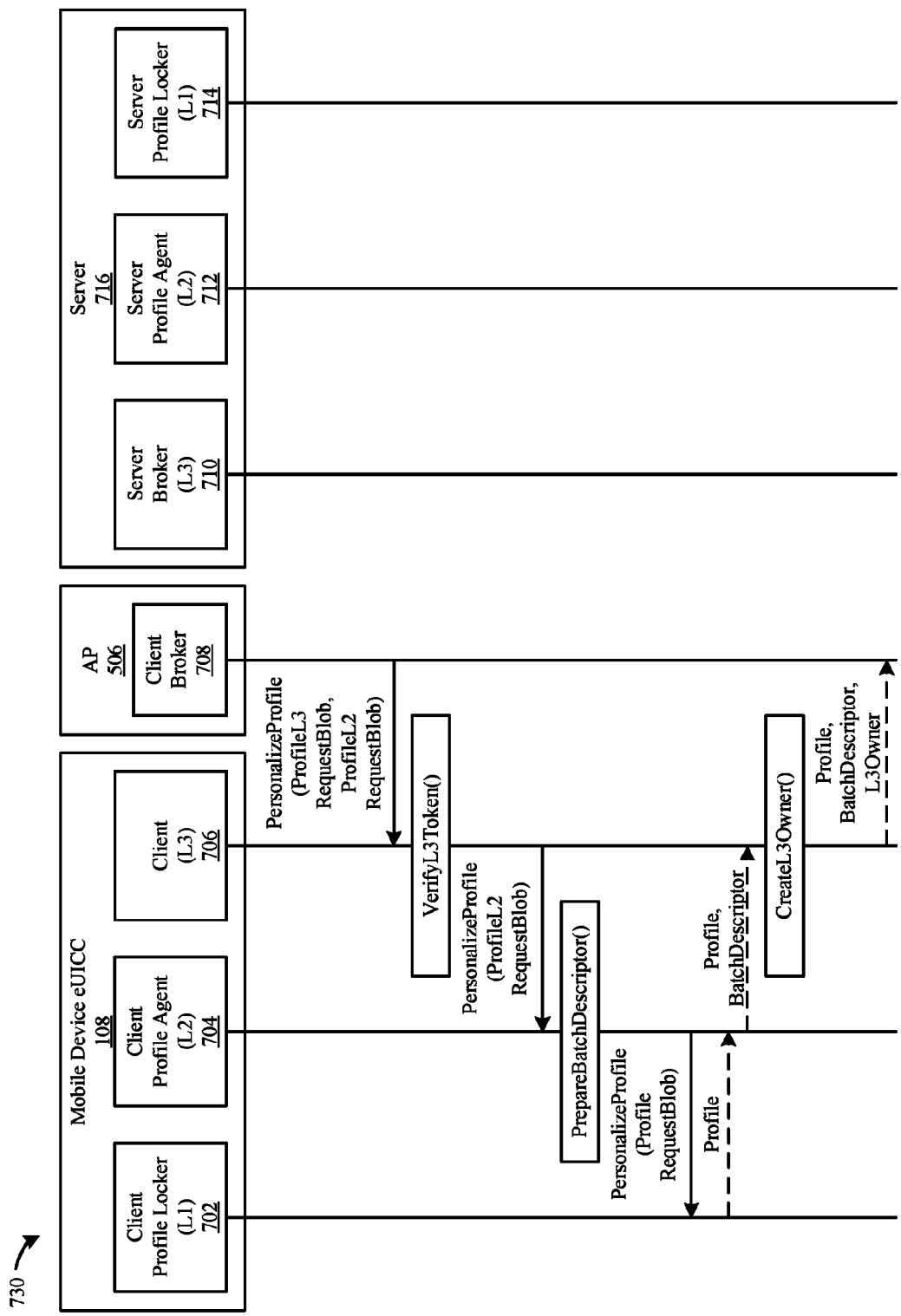
Figure 7D:
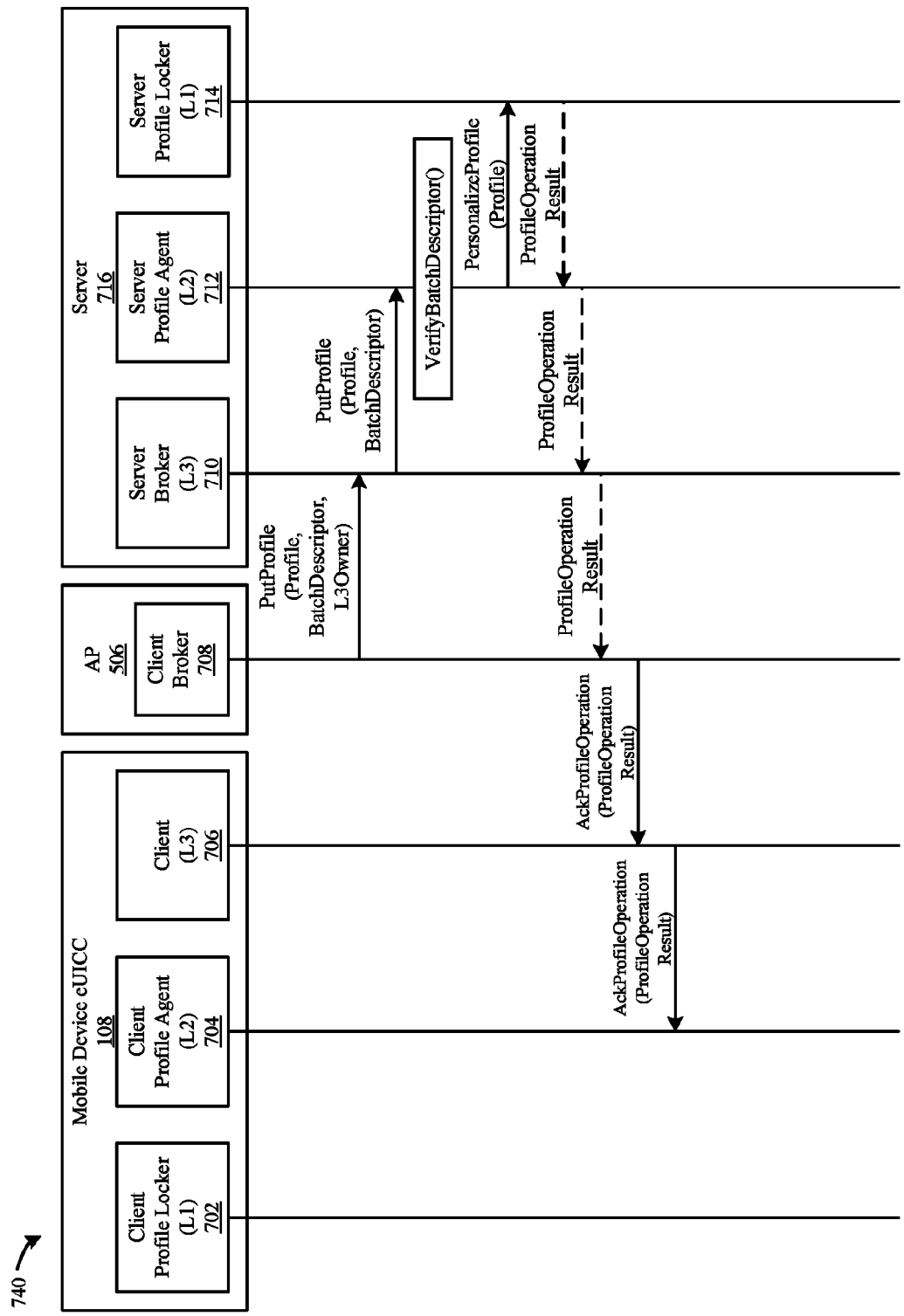

FIG. 6 illustrates a block diagram 600 of a representative configuration of components for verification and/or authentication using a trusted execution environment (TEE) in a mobile device 102, e.g., the TEE 120 of mobile device 102, according to some embodiments. The TEE 120 can operate in accordance with one or more GP specifications, in some embodiments. The TEE 120 can be considered a virtual secure element (SE) with which the eUICC 108 of the mobile device 102 can establish a trusted secure relationship. One or more trusted secure inputs, e.g., the secure I/O 318, such as a secure display and/or keyboard, and the secure biometric sensor 116, such as the fingerprint scanner 308, can provide via a secure communication link information by which human intent verification and/or user authentication can be realized, at least in part. A secure application 608, which can be used in some embodiments for human intent verification and/or user authentication, can be linked with the trusted secure inputs via the TEE 120. In some embodiments, the secure application 608 executes as part of a rich operating system (OS) 607 and the TEE 120. The TEE 120 can include a trusted kernel 610 in which can be stored secure credentials, e.g., keys, certificates, and the like, which can be used for mutual authentication between the TEE 120 and the eUICC 108. As with the hardware eSE 118, the software TEE 120 can establish a trusted relationship with the eUICC 108 that uses mutual authentication for secure communication similar to secure communication with a server external to the mobile device 102. The TEE 120 can process information received via secure inputs to verify human intent and/or to authenticate a user before performing one or more administrative operations for one or more eSIMs 208 on the eUICC 108. Thus, mutual authentication 614 between the TEE 120 and the eUICC 108 can be required in order to perform an eSIM operation 616 on the eUICC 108. In some embodiments the TEE 120 interfaces with secure hardware 612, e.g., an Advanced Reduced Instruction Set Computing (RISC) Machine (ARM) trusted zone hardware module, which can store keys and/or certificates for the mutual authentication 614 between the TEE 120 and the eUICC 108. As with the eSE 118, the TEE 120 can use symmetric keys and/or PKI certificates as L3 credentials for mutual authentication, and the L3 credentials can be installed during and/or after manufacture of the mobile device 102. In some embodiments, the TEE 120 can generate symmetric keys after installation of one or more certificates, e.g., for use by a symmetric key based secure channel protocol, such as GP SCP11. In some embodiments, the TEE 120 can be used for human intent verification, e.g., based on input obtained via the secure I/O 318. In some embodiments, the TEE 120 operates in conjunction with the OS 604 of the mobile device 102 to perform user authentication and/or human intent verification. In some embodiments, OS-based software/hardware used for security and/or malware protection can be used in conjunction with the TEE 120 and/or supplement the security features of the TEE 120 to prevent malware hijacking of the OS 604 and/or user interfaces, such as displays and keyboards.

FIGS. 7A to 7D illustrate a sequence diagram 700/720/730/740 for exporting an eSIM 208 from an eUICC 108 with user authentication via an external server 716 by a mobile device 102, according to some embodiments. The mobile device 102 can include the eUICC 108, which can implement multiple levels of security, including, for example, a first level (L1) that performs encryption and re-encryption functions, a second level (L2) that performs anti-cloning functions to prevent cloning of eSIMs 208, and a third level (L3) that performs identity determination, trusted secure communication, user authentication, and/or human intent verification functions for the mobile device 102. A user of the mobile device 102 can link an external user account, such as an email account, an Apple ID, a Facebook account, etc., with one or more eSIMs 208 during and/or after their installation on the eUICC 108. Credentials associated with each of these external user accounts can be verified by communicating with third party servers that service those external user accounts. The mobile device 102 can interface with an external server 716 that in turn can communicate with additional third party servers for user authentication. Before one or more administrative operations for the one or more eSIMs 208 can be performed, and/or for other administrative operations for the eUICC 108, user authentication and/or human intent verification can be required, which can be realized using techniques as described further herein.

FIGS. 7A to 7D illustrate a representative set of actions that can occur to include user authentication as part of a process to export an eSIM 208 from the eUICC 108 of the mobile device 102, where the user authentication includes an external server 716 that can be in communication with additional third party servers to authenticate the user based on credentials provided by the mobile device 102. The mobile device 102 can include within the eUICC 108 a client profile locker 702, which can store one or more eSIMs 208 protected by L1 security protocols, a client profile agent 704, which can protect against cloning of the one or more eSIMs 208 using L2 security protocols, and a client 706, which can implement L3 security protocols for user authentication, for identity determination, to establish and maintain trust relationships, and for authorization to perform various administrative operations, such as for eSIMs 208 and/or eUICC 108 firmware/software. The external server 716 can include parallel L1/L2/L3 components, such as the server broker 710, which can implement L3 security protocols, the server profile agent 712, which can implement L2 security protocols, and the server profile locker 714, which can implement L1 security protocols.

In some embodiments, a client broker 708, which can be executed by the AP 506 of the mobile device 102, can prompt a user of the mobile device 102, e.g., via a secure I/O 122, to obtain user inputs with which to verify authorization to perform one or more administrative functions for eSIMs 208 of the eUICC 108 (and/or for firmware/software changes to the eUICC 108). A representative administrative operation can include an Export eSIM operation to move the one or more eSIMs 208 to another mobile device, to store the one or more eSIMs 208 in a secure external server (e.g., in the cloud), and/or to transfer the one or more eSIMs 208 from the eUICC 108 to the mobile device's AP 506 within the mobile device 102. In some embodiments, the user inputs obtained by the mobile device 102 include user credentials that can be used to authenticate the user via an external server, such as server 716, which can communicate with one or more other third party servers. User credentials can include a user name and password for a particular user account associated with the user of the mobile device 102. The client broker 708 of the AP 506 obtains an authorization token (labeled as AuthToken) used for L3 security associated with the one or more eSIMs 208 that the user seeks to export from the eUICC 108. As described further herein, during and/or after installation of the eSIMs 208, authorization tokens can be generated and associated with the eSIMs 208 to provide for authentication of the user via the external server 716 and associated third party servers. The authorization token can be used to determine whether the user is authorized to export the eSIMs 208 (and/or perform other administrative operations for the eSIMs 208 and/or for the eUICC 108). Determination of user authorization by the mobile device 102 can include communicating with the external server 716. The client broker 708 provides a Profile Descriptor for the eSIM 208 and a current L3 associated authorization token for the eSIM 208 to the L3 client 706 of the eUICC 108, which returns a Signed Identity Map (based on the profile of the eSIM 208 and the current L3 authorization token) to the client broker 708 of the AP 506 of the mobile device 102. The client broker 708 sends a request for exporting the eSIM 208 to the L3 server broker 710 of the external server 716, including the Signed Identity Map, which can be used by the L3 server broker 710 of the external server 716 to authenticate the user's authority to cause execution of the export (or other administrative operation) of the eSIM 208. In some embodiments, the current L3 authorization token includes information that the L3 server broker 710 of the external server 716 can use to communicate with a third party server to authenticate the user of the mobile device 102. When the user is authenticated, the L3 server broker 710 can store the L3 authorization token and can subsequently establish a session with the eUICC 108 of the mobile device 102 to perform the requested administrative operation, e.g., to export the eSIM 208 from the eUICC 108.

FIGS. 8A to 8D illustrate a sequence diagram 800/820/830/840 for installing an eSIM 208 with user authentication via an external server 716 by a mobile device 102, according to some embodiments. When installing the eSIM 208, the mobile device 102 can associate with the eSIM 208 one or more user accounts with which to authenticate the user subsequently in response to requested administrative operations that can impact the eSIM 208. In some embodiments, an eSIM 208 already installed on the eUICC 108 of the mobile device 102 can be associated with one or more user accounts with which to authenticate the user for subsequent administrative operations involving the eSIM 208. In some embodiments, installation of the eSIM 208 can occur only when user credentials for one or more user accounts are verified via an external server 716, which can communicate with additional third party servers to authenticate the user credentials. In some embodiments, a user of the mobile device 102 can associate a particular user account (and/or a particular set of user credentials) with an eSIM 208, e.g., as a current user account, and later change to associate the eSIM 208 with a different new or next user account.

In some embodiments, the AP 506 can prompt a user to enter a set of user credentials for a user account for the mobile device 102 to use to authorize administrative operations for one or more eSIMs 208 and/or for the eUICC 108. The client broker 708 of the AP 506 can provide the user credentials (and/or information derived therefrom) to the L3 client 706 of the eUICC 108 of the mobile device 102 and obtain in return a Signed Identity Map, which can include the user credentials and/or information based on the user credentials that can be used to authenticate the user. The Signed Identity Map can be provided by the client broker 708 of the AP 506 to the L3 server broker 710 of the external server 716, which can authenticate the user (and/or to determine authority of the user to cause execution of one or more requested administrative operations at the mobile device 102) with a third party server. Upon successful authentication of the user by the external server 716 with the third party server based on the user credentials supplied with the Signed Identity Map, installation of the eSIM 208 can proceed at the mobile device 102. In some embodiments, the L3 server broker 710 of the external server 716 generates one (or multiple) one-time code(s) (OTC) to provide to the L3 client 706 of the eUICC 108 to obviate the need to authenticate the user again with a third party server for a session during which the one or more administrative operations (such as installation of the eSIM 208) occurs. When the session is established, e.g., as indicated by the CreateSession command, one or more OTCs can be communicated form the client broker 708 of the AP 506 to the L3 client 706 of the eUICC 108 to use later during the session as required to complete the one or more administrative operations, e.g., to provide prove of authentication with the L3 server broker 710 of the external server 716 from the L3 client 706 without needing the L3 server broker 710 of the external server 716 to re-check with the third party server during execution of the one or more administrative functions. For example, in FIG. 8B, the ProfileL3RequestBlob provided from the L3 client 706 to the client broker 708 of the AP 506 and included in the Personalize Profile command sent to the L3 server broker 710 of the external server 716 can include at least one of the OTCs to verify that the administrative operations requested by the session have been authorized for the user of the mobile device 102 during the current session. In some embodiments, the OTCs can be limited for use to a period of time, e.g., based on a time stamp or other time counting mechanism can ensure that the OTCs expire after the limited time period. Thus, the L3 server broker 710 of the external server 716 can verify by checking a time stamp of the OTC included in the ProfileL3RequestBlob to verify that the session user authentication remains valid.

Figure 8A:
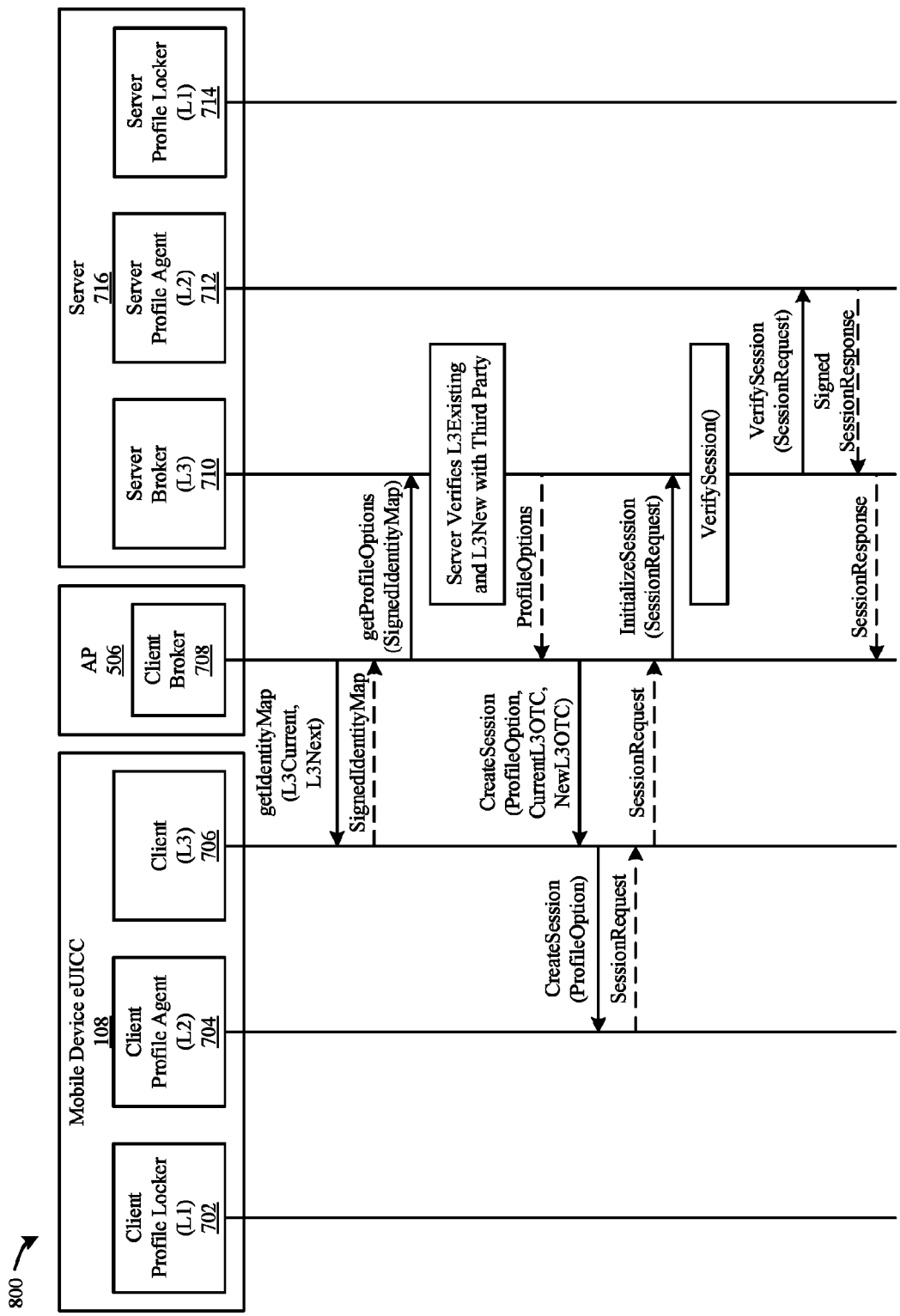
FIGS. 8A to 8D illustrate a sequence diagram for installing an eSIM with user authentication via an external server by a mobile device, according to some embodiments.
Figure 8B:
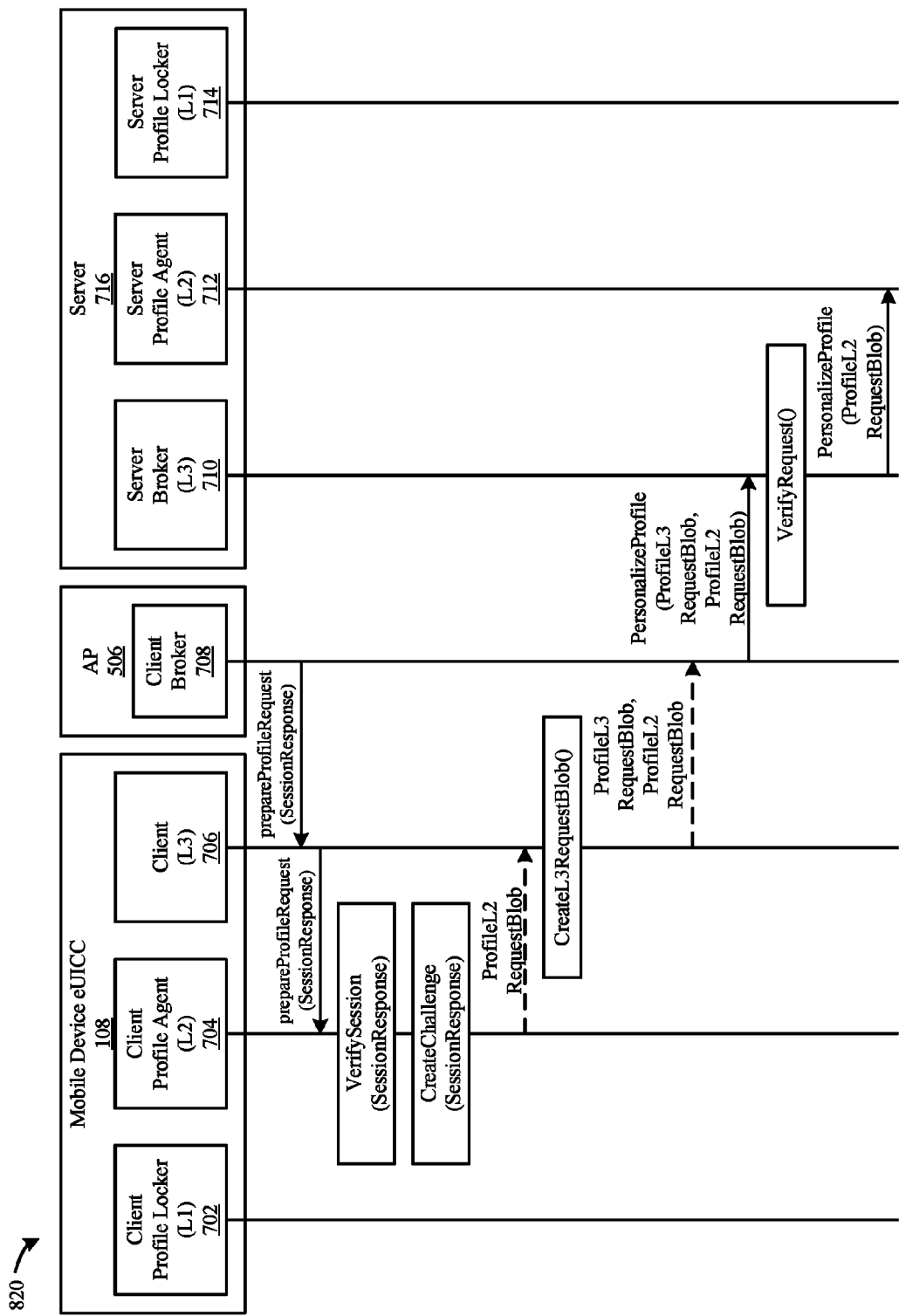
Figure 8C:
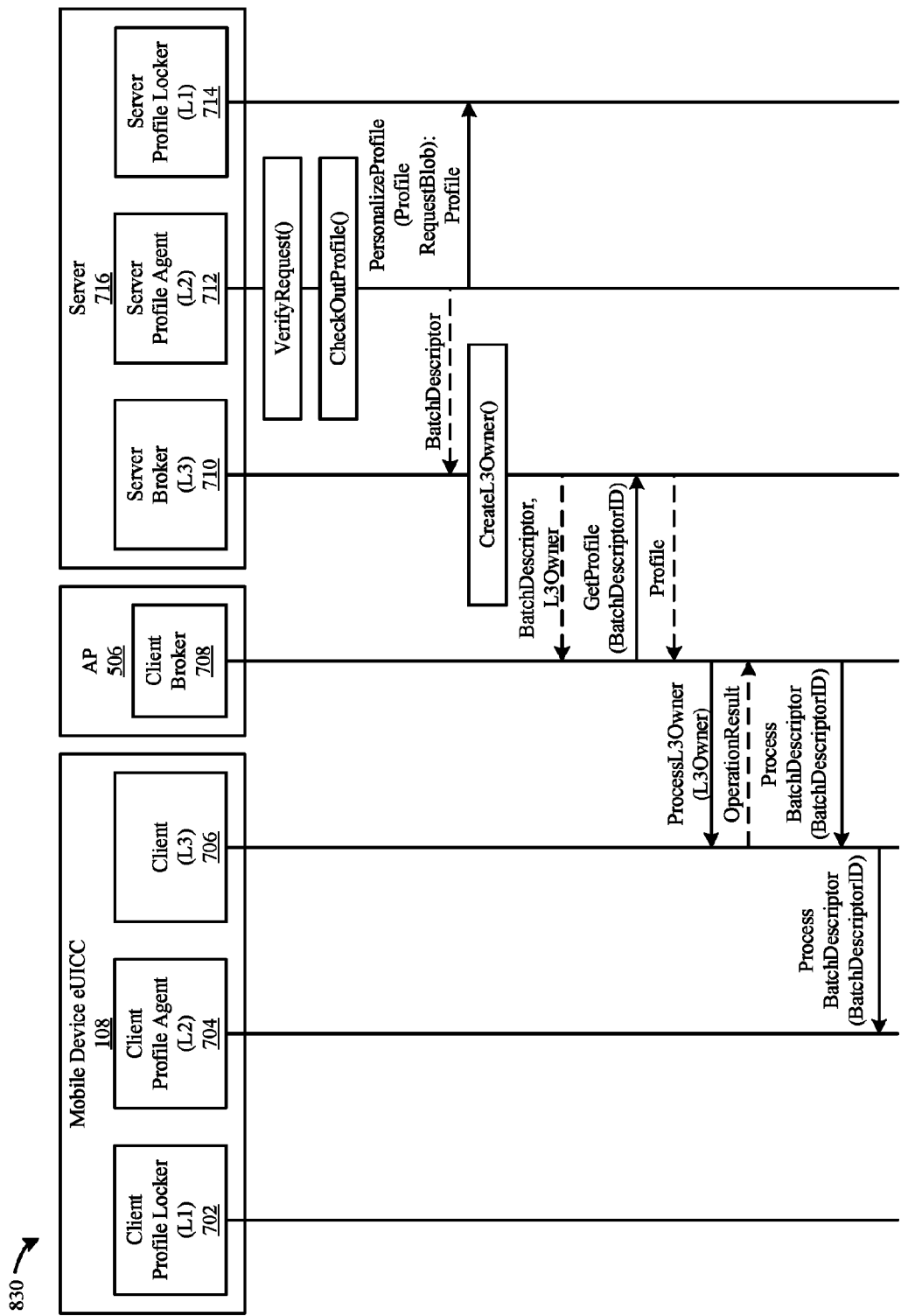
Figure 8D:
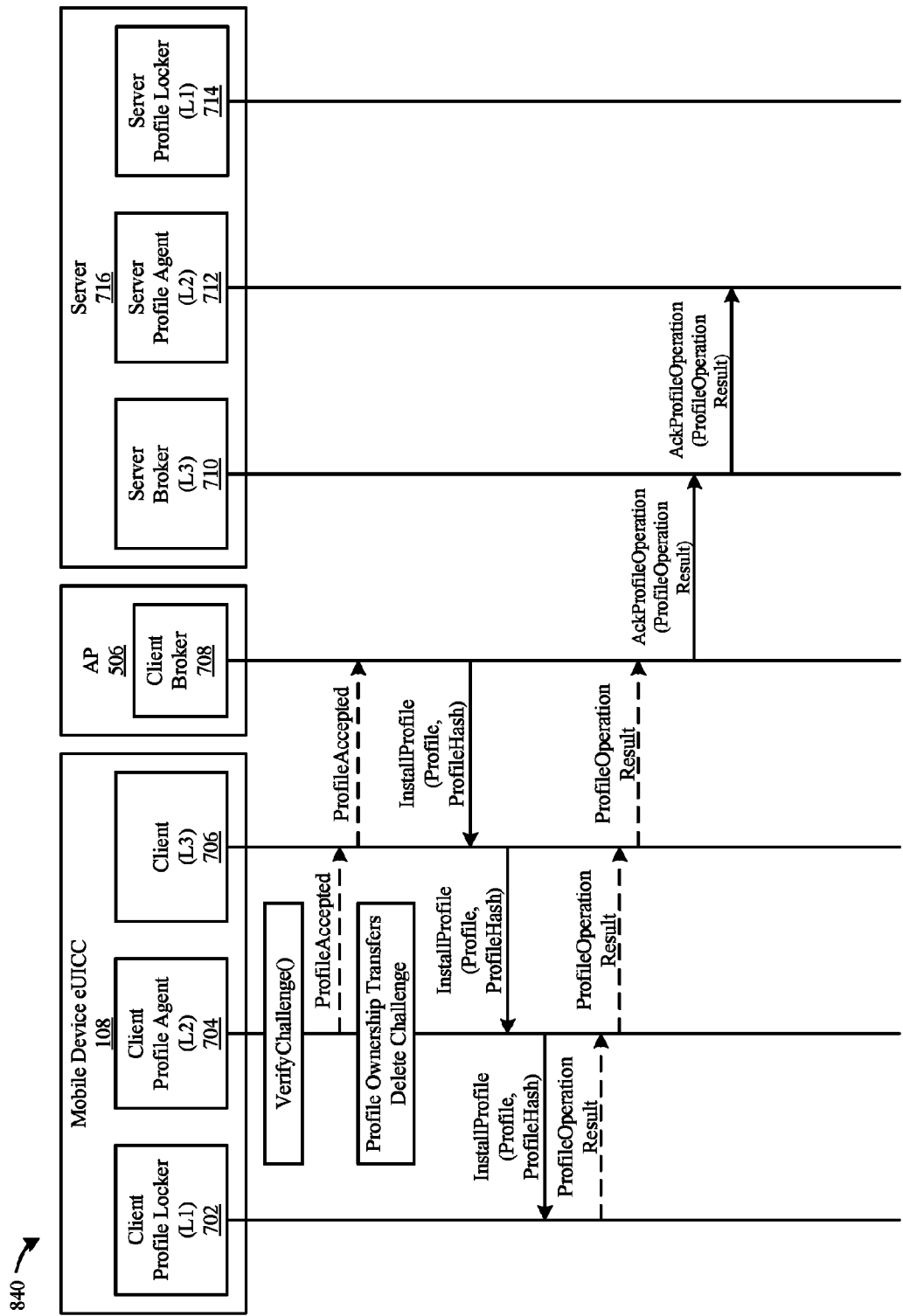

In some embodiments, as illustrated in FIG. 8C, the L3 server broker 710 of the external server 716 creates an L3 Owner that ties a particular eSIM 208 with the user credentials associated with a particular user account, e.g., an Apple ID account, a Yahoo account, a Facebook account, and the like. The AP 506, as shown in FIG. 8B, requests that the eSIM 208 be personalized (as indicated by the Personalize Profile request communicated to the L3 server broker 710) for the user, in accordance with user credentials provided in the ProfileL3RequestBlob to the L3 server broker 710. In some embodiments, e.g., when OTCs are not in use, the L3 server broker 710 can verify user authentication with a third party server as required during the session when personalizing the eSIM 208 for the user of the mobile device 102. As shown in FIGS. 8B and 8C, the external server 716 can verify the request to personalize the eSIM 208 at both the L3 level, by the L3 server broker 710, and at the L2 level, by the server profile agent 712. Upon successful verification, the eSIM 208 can be retrieved from the L1 server profile locker 714 and communicated to the AP 506 of the mobile device 102 in conjunction with the L3 owner to tie the eSIM 208 with the user account for subsequent verification for administrative operations that impact the eSIM 208. The L3 owner information is transferred to the eUICC 108 (specifically to the L3 client 706) and can be stored at the eUICC 108 thereby associating at the eUICC 108 the particular eSIM 208 with the user account by which to perform user authentication for one or more administrative operations for the eSIM 208. The Export eSIM administrative operation illustrated in FIGS. 7A to 7D, and described herein, can use the stored user credential information of the L3 owner for user authentication of the Export eSIM administrative operation. In some embodiments, the L3 owner structure includes information of a specific third party service to be contacted for user authentication to authorize one or more administrative operations for the eSIM 208 associated with the L3 owner.

Figure 9A:
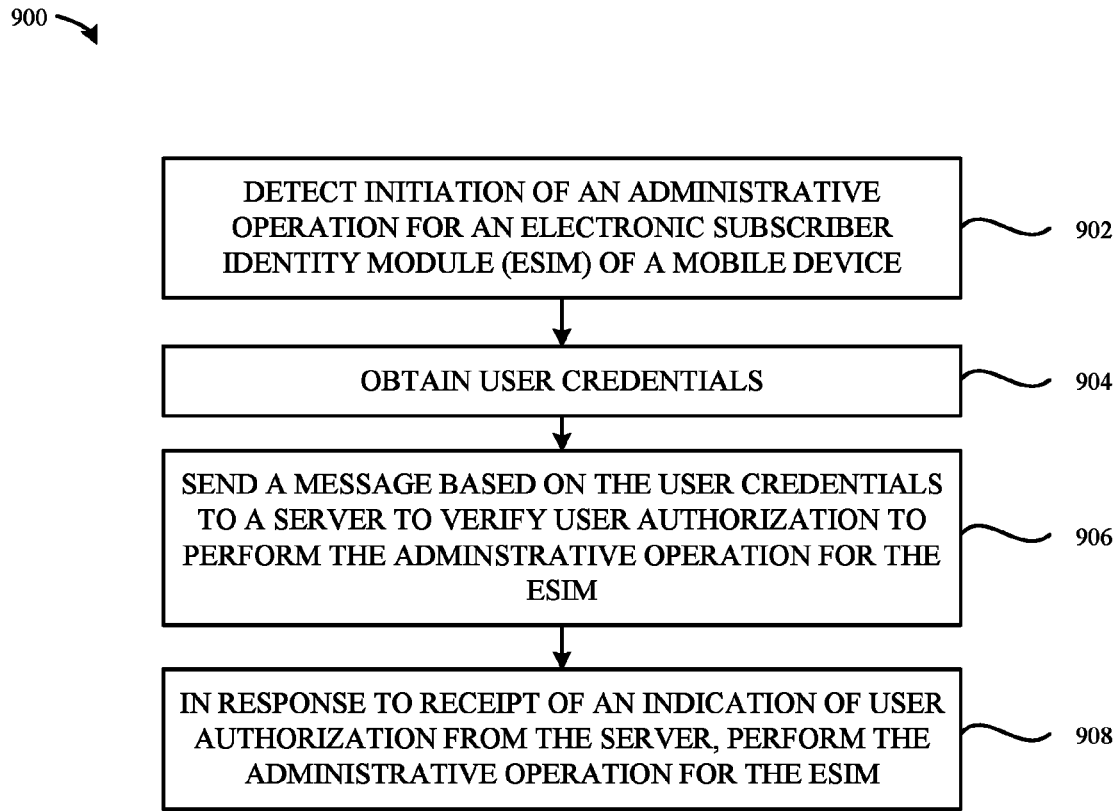
FIGS. 9A and 9B illustrate representative methods for user authentication for administrative operations for eSIMs and/or an eUICC of a mobile device, according to some embodiments.

FIG. 9A illustrates a flowchart 900 of a representative method for user authentication for administrative operations for eSIMs 208 and/or for an eUICC 108 of a mobile device 102, according to some embodiments. In step 902, a processor, such as processor 104 and/or AP 506, of the mobile device 102 detects initiation of (and/or a request to initiate) an administrative operation for an eSIM 208 of the mobile device 102. In some embodiments, the processor determines that the administrative operation for the eSIM 208 requires additional authentication of a user and/or human intent verification, before execution of the administrative operation for the eSIM 208 can be carried out. In step 904, the mobile device 102 obtains user credentials, e.g., via a secure I/O 122 and/or using a biometric sensor 116 to determine a particular user and/or a user account with which to verify authorization to perform the administrative operation. In some embodiments, user authentication alone based on user credentials and/or in combination with human intent verification based on separate input, can be required to complete the administrative operation. In some embodiments, in step 906, the processor of the mobile device 102 sends a message based on (and/or including versions of) the user credentials to an external server to verify user authorization to perform the administrative operation for the eSIM 208. In some embodiments, the external server uses the user credential information to perform user authentication with a third party server. In step 908, in response to receipt of an indication of user authorization from the external server, the mobile device 102 performs (or completes performance of) the administrative operation for the eSIM 208.

Certain eSIMs 208, and/or certain administrative operations for certain eSIMs 208, can be exempt from human intent verification and/or for user authentication. Representative eSIMs 208 that can be exempt for administrative operations can include eSIMs 208 that provide limited, specialized functionality, such as a provisioning eSIM 208 used to obtain a regular eSIM 208 and/or an emergency services eSIM 208 used to provide emergency communication. Switching to use of (and/or installing, enabling, activating) a provisioning eSIM 208 can provide for initialization and/or recovery of communication functionality for the mobile device 102. Similarly, switching to use of (and/or installing, enabling, activating) an emergency services eSIM 208 can provide limited communication via a particular wireless network and/or access to a particular set of emergency communication services, such as dialing 911 in the United States and/or access to other emergency services such as police, fire, and/or emergency medical services. Restrictions that may apply to one or more regular eSIMs 208 can be lifted when switching to certain eSIMs 208, such as to a provisioning eSIM 208 and/or to an emergency services eSIM 208. Switching back to a regular eSIM 208 from an exempted eSIM 208, however, can require human intent verification and/or user authentication. In some embodiments, the eUICC 108 enforces restrictions and/or exemptions for human intent verification and/or user authentication for eSIMs 208 based on a type of eSIM 208 and/or based on a type of administrative operation for a type of eSIM 208. In some embodiments, the eUICC 108 enforces restrictions on administrative operations for eSIMs 208 based on one or more policies. An eSIM 208 or set of eSIMs 208 can have an associated policy that indicates restrictions and/or exemptions apply for all, some, or none of a set of administrative operations for the eSIM 208. Human intent verification and/or user authentication can be used by the eUICC 108 of the mobile device 102 to prevent malware from interfering with operation of the mobile device 102 and/or network equipment of a wireless network, such as by limiting switching between eSIMs 208 at the mobile device 102 and/or communicating with the wireless network to switch between eSIMs 208 to rapidly or often. Certain eSIMs 208, such as provisioning eSIMs 208 to gain initial access to select and/or load a regular eSIM 208, or to recover use of a previously installed eSIM 208, can be exempt from human intent verification and/or user authentication, at least for certain administrative operations such as switching to a provisioning eSIM 208. Similarly, switching to, enabling, installing, and/or activating an emergency services eSIM 208 can be exempt from human intent verification and/or user authentication, in some embodiments. Switching back to a regular eSIM 208 from an exempt eSIM 208, such as from a provisioning eSIM 208 or an emergency services eSIM 208, can be subject to human intent verification and/or user authentication. Thus, malware can be prevented from switching too rapidly and/or too often between eSIMs 208, including provisioning eSIMs 208 or emergency services eSIMs 208, by exempting human user verification and/or user authentication only in one direction, e.g., switching to a provisioning eSIM 208 or an emergency services eSIM 208, while requiring human user verification and/or user authentication in the other direction, e.g., switching from a provisioning eSIM 208 or an emergency services eSIM 208 back to a regular eSIM 208. In some embodiments, the eUICC 108 can enforce rules to ensure that switching between two or more different eSIMs 208 that each are exempt from human intent verification and/or user authentication does not occur too frequently or too many times within a time interval or with a minimum time separation between switches. In some embodiments, when multiple eSIMs 208 are exempt from human intent verification and/or user authentication, the eUICC 108 can permit switching to a particular eSIM 208 at any time, such as an emergency services eSIM 208, from any other eSIM 208, but can require limitations on switching away from the particular eSIM 208, such as away from the emergency services eSIM 208. Thus, access to emergency services can bypass human intent verification and/or user authentication without allowing malware to adversely affect operation of the mobile device 102 and/or network equipment of associated wireless networks due to excessive switching among eSIMs 208.

Figure 9B:
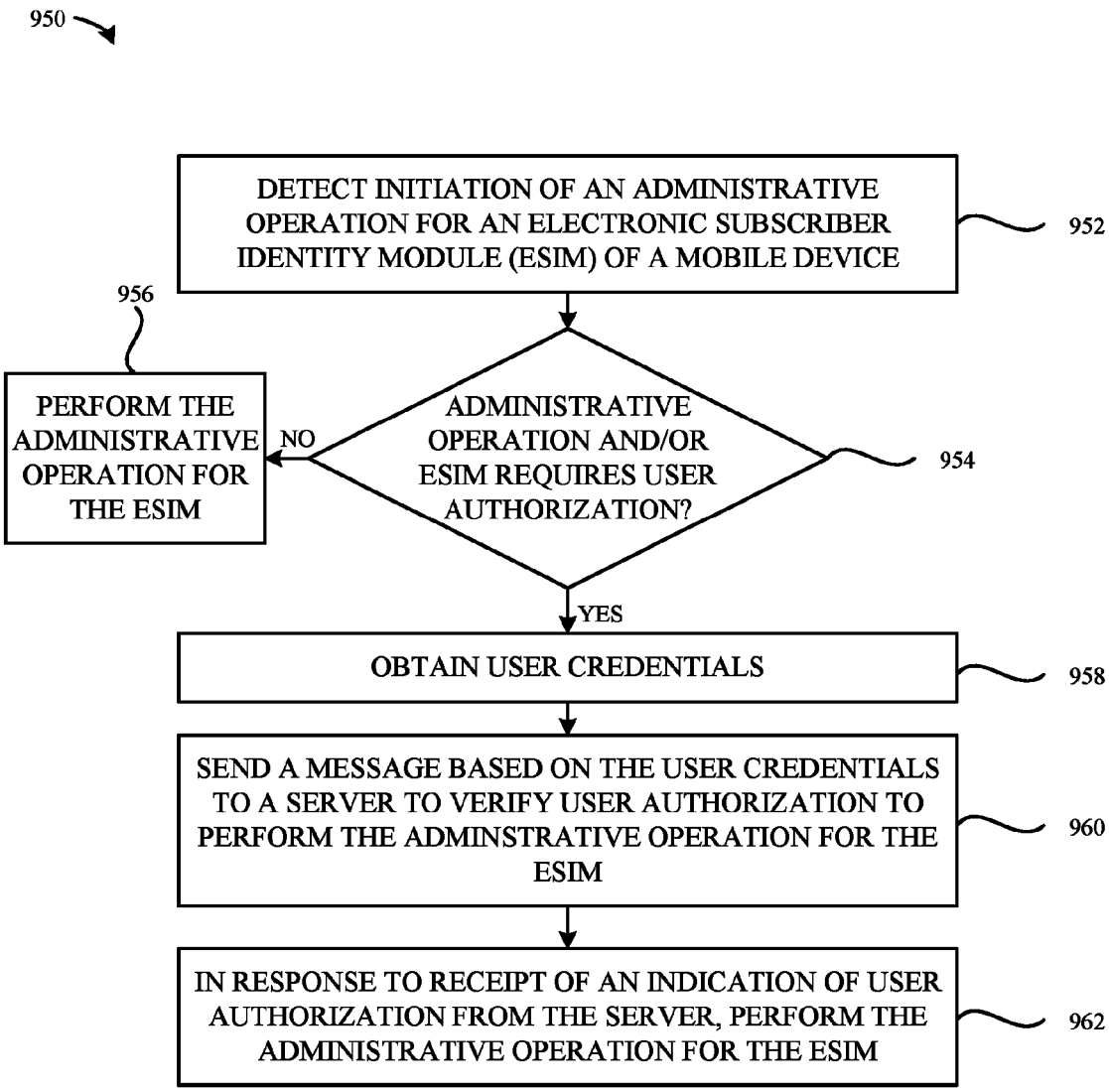

FIG. 9B illustrates a flowchart 950 of a representative method for user authentication for administrative operations for eSIMs 208 and/or for an eUICC 108 of a mobile device 102, with exemption handling, according to some embodiments. In step 952, a processor, such as processor 104 and/or AP 506, of the mobile device 102 detects initiation of (and/or a request to initiate) an administrative operation for an eSIM 208 of the mobile device 102. In step 954, the processor determines whether the administrative operation for the eSIM 208 requires additional authentication of a user and/or human intent verification, before execution of the administrative operation for the eSIM 208 can be carried out. When the administrative operation for the eSIM 208 does not require human intent verification and/or user authentication, in step 956, the mobile device 102 performs (and/or completes performance of) the administrative operation for the eSIM 208. Representative eSIMs 208 that can be exempted from human intent verification and/or user authentication, particularly when switching to, enabling, installing, and/or activating such an eSIMs 208, include provisioning eSIMs 208 (providing limited communication capability for specialty purposes such as for loading, installing, and/or recovering regular eSIMs 208) and emergency services eSIMs 208 (providing limited communication capability to particular emergency services). In step 958, the mobile device 102 obtains user credentials, e.g., via a secure I/O 122 and/or using a biometric sensor 116 to determine a particular user and/or a user account with which to verify authorization to perform the administrative operation. In some embodiments, user authentication alone based on user credentials and/or in combination with human intent verification based on separate input, can be required to complete the administrative operation. In some embodiments, in step 960, the processor of the mobile device 102 sends a message based on (and/or including versions of) the user credentials to an external server to verify user authorization to perform the administrative operation for the eSIM 208. In some embodiments, the external server uses the user credential information to perform user authentication with a third party server. In step 962, in response to receipt of an indication of user authorization from the external server, the mobile device 102 performs (or completes performance of) the administrative operation for the eSIM 208.

Figure 10A:
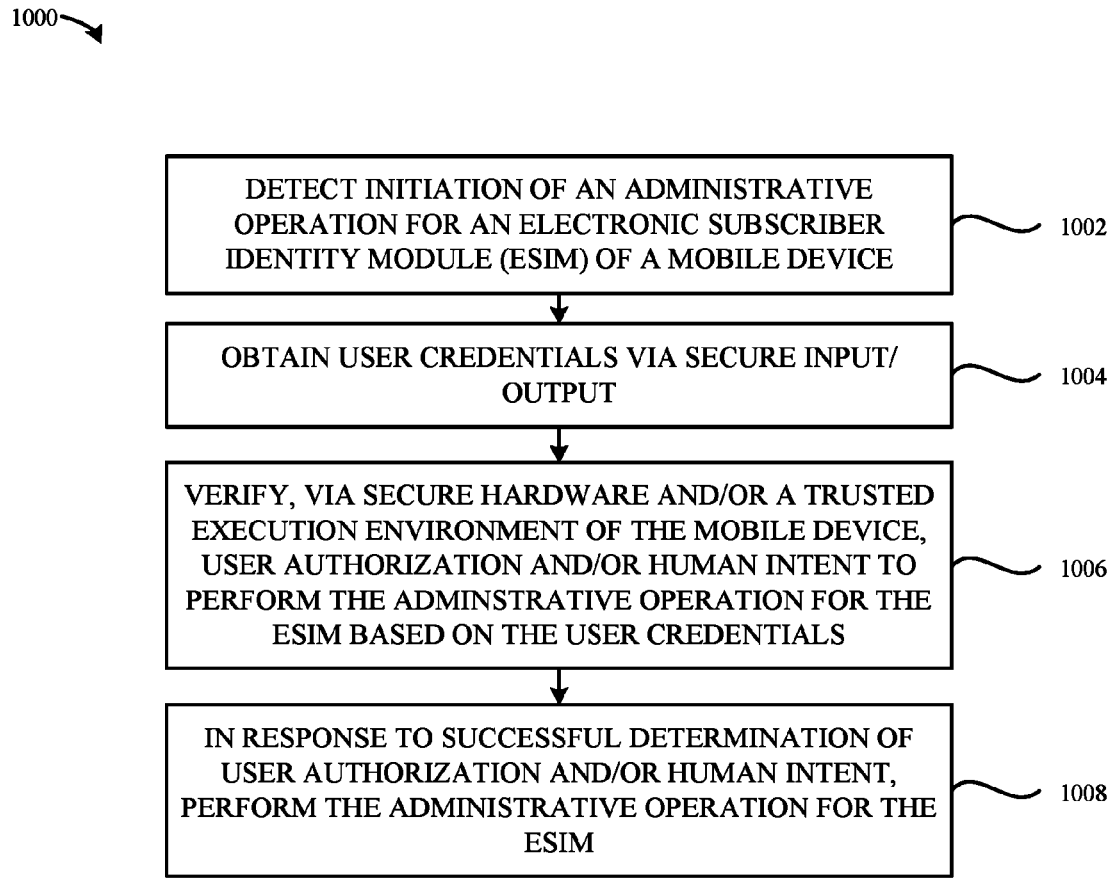
FIGS. 10A and 10B illustrate representative methods for human intent verification for administrative operations for eSIMs and/or for an eUICC of a mobile device, according to some embodiments.

FIG. 10A illustrates a flowchart 1000 of a representative method for human intent verification and/or user authentication for administrative operations for eSIMs 208 and/or for an eUICC 108 of a mobile device 102, according to some embodiments. In step 1002, a processor, such as processor 104 and/or AP 506, of the mobile device 102 detects initiation of (and/or a request to initiate) an administrative operation for an eSIM 208 of the mobile device 102. In some embodiments, the processor determines that the administrative operation for the eSIM 208 requires additional authentication of a user and/or human intent verification, before execution of the administrative operation for the eSIM 208 can complete. In step 1004, the mobile device 102 obtains user credentials, e.g., via a secure I/O 122 and/or using a biometric sensor 116 to determine a particular user and/or a user account with which to verify human intent to perform the administrative operation for the eSIM 208. In some embodiments, the secure I/O 122 and/or the biometric sensor 116 communicate directly with a secure hardware element and/or with a trusted execution environment of the mobile device 102. In step 1006, the mobile device 102, via the secure hardware element and/or the trusted execution environment, determines whether a user is authorized to cause the administrative operation for the eSIM 208 and/or verifies a human intent to cause the administrative operation for the eSIM 208. In step 1008, in response to successful determination of user authorization and/or human intent, the mobile device 102 performs (and/or completes performance of) the administrative operation for the eSIM 208.

Figure 10B:
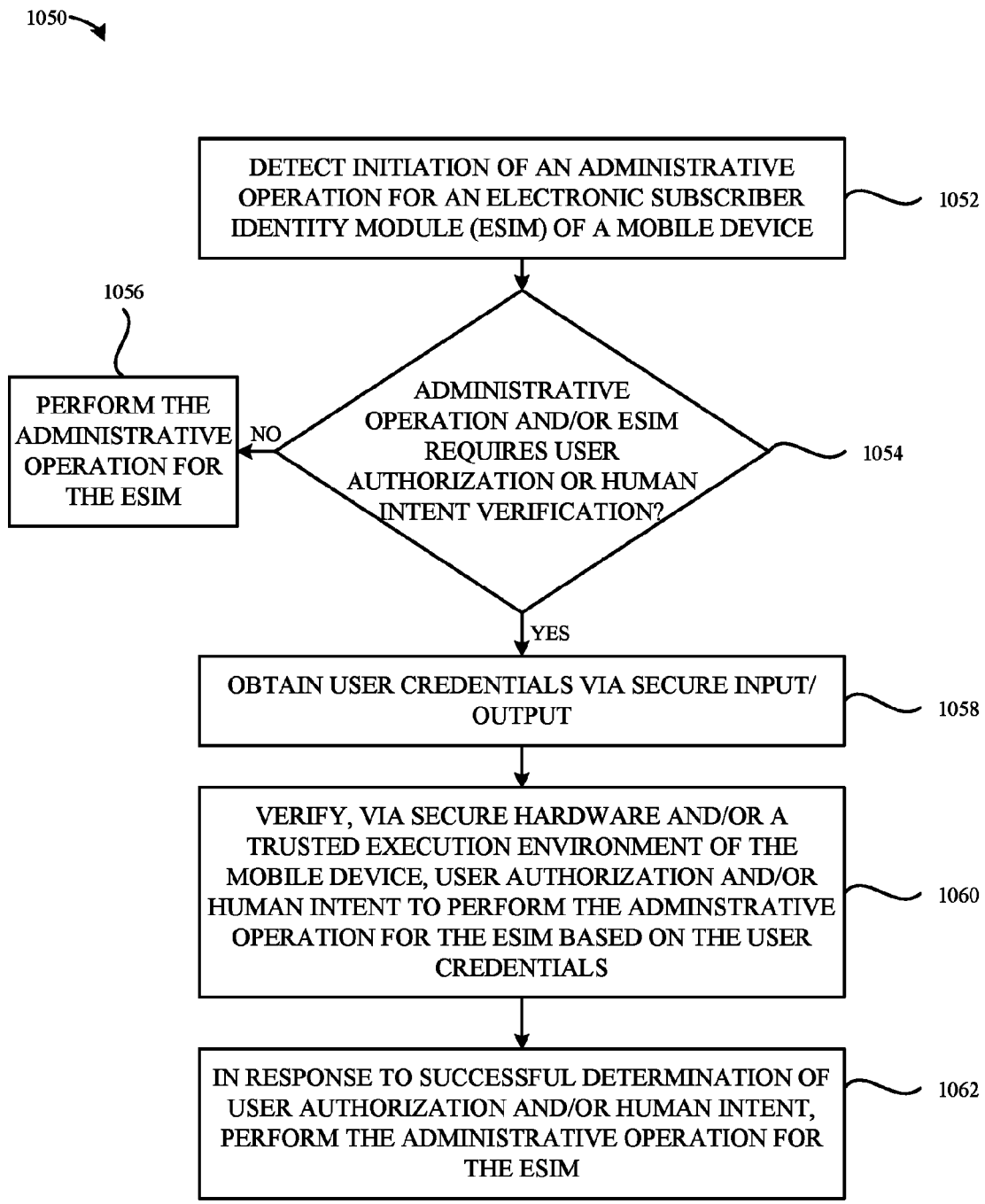

FIG. 10B illustrates a flowchart 1050 of a representative method for human intent verification for administrative operations for eSIMs 208 and/or for an eUICC 108 of a mobile device 102, with exemption handling, according to some embodiments. In step 1052, a processor, such as processor 104 and/or AP 506, of the mobile device 102 detects initiation of (and/or a request to initiate) an administrative operation for an eSIM 208 of the mobile device 102. In step 1054, the processor determines whether the administrative operation for the eSIM 208 and/or the eSIM 208 requires additional authentication of a user and/or human intent verification, before execution of the administrative operation for the eSIM 208 can complete. When the administrative operation for the eSIM 208 does not require user authentication and/or human intent verification, in step 1056, the mobile device 102 performs (and/or completes performance of) the administrative operation for the eSIM 208. When the administrative operation for the eSIM 208 and/or the eSIM 208 requires human intent verification and/or user authentication, the mobile device 102 undertakes additional steps to determine whether to perform (or complete performance of) the administrative operation for the eSIM 208. In step 1058, the mobile device 102 obtains user credentials, e.g., via a secure I/O 122 and/or using a biometric sensor 116 to determine a particular user and/or a user account with which to verify human intent to perform the administrative operation for the eSIM 208. In some embodiments, the secure I/O 122 and/or the biometric sensor 116 communicate directly with a secure hardware element and/or with a trusted execution environment of the mobile device 102. In step 1060, the mobile device 102, via the secure hardware element and/or the trusted execution environment, determines whether a user is authorized to cause the administrative operation for the eSIM 208 and/or verifies a human intent to cause the administrative operation for the eSIM 208. In step 1062, in response to successful determination of user authorization and/or human intent, the mobile device 102 performs (and/or completes performance of) the administrative operation for the eSIM 208.

Representative Embodiments

In some embodiments, a method for user authentication of administrative operations for an embedded Universal Integrated Circuit Card (eUICC) included in a mobile device, includes the following actions performed by the mobile device: (a) detecting initiation of an administrative operation for an electronic Subscriber Identity Module (eSIM) of the mobile device; (b) obtaining user credentials; (c) sending a message based on the user credentials to a server to verify user authorization to perform the administrative operation for the eSIM; and (d) in response to receipt of an indication of user authorization from the server, performing the administrative operation for the eSIM.

In some embodiments, the administrative operation includes installation, importing, modification, deletion, or exporting of the eSIM. In some embodiments, the user credentials are associated with a user account for a user of the mobile device. In some embodiments, the user credentials are verified by a third party server for the user account. In some embodiments, the user credentials includes a user login identity and a password for the user account. In some embodiments, the server includes a level 3 (L3) server configured to manage eSIMs for one or more mobile network operators (MNOs), and the message is signed by the eUICC. In some embodiments, the method further includes the mobile device receiving a one-time code (OTC) from the server that is valid for re-authentication of the user during performance of the administrative operation for the eSIM. In some embodiments, the mobile device obtains the user credentials through a secure input/output interface of the mobile device. In some embodiments, the mobile device obtains the user credentials through a biometric sensor of the mobile device. In some embodiments, the method further includes the eUICC obtaining an authentication token based on the user credentials; and the eUICC generating the message sent to the server, where the message includes a signed payload that includes the authentication token.

In some embodiments, a method for human intent verification of administrative operations for an embedded Universal Integrated Circuit Card (eUICC) included in a mobile device, includes the following performed by the mobile device: (a) detecting initiation of an administrative operation for an electronic Subscriber Identity Module (eSIM) of the mobile device; (b) obtaining user credentials via a secure input/output (I/O); (c) verifying, via secure hardware and/or a trusted execution environment (TEE) of the mobile device, human intent to perform the administrative operation for the eSIM based on the user credentials; and (d) in response to successful determination of human intent to perform the administrative operation, performing the administrative operation for the eSIM.

In some embodiments, the administrative operation comprises installation, importing, modification, deletion, or exporting of the eSIM. In some embodiments, the method further includes the mobile device: (e) obtaining additional user credentials to authenticate a user of the mobile device; (f) sending a message based on the additional user credentials to a server to verify user authorization to perform the administrative operation for the eSIM; and (g) in response to receipt of an indication of user authorization from the server and successful determination of human intent to perform the administrative operation, performing the administrative operation for the eSIM. In some embodiments, the additional user credentials are associated with a user account for the user of the mobile device, and the additional user credentials are verified by a third party server for the user account. In some embodiments, the additional user credentials includes a user login identity and a password for the user account. In some embodiments, the server includes a level 3 (L3) server configured to manage eSIMs for one or more mobile network operators (MNOs), and the message is signed by the eUICC. In some embodiments, the mobile device obtains the additional user credentials through a biometric sensor of the mobile device. In some embodiments, the mobile device obtains the additional user credentials through the secure I/O of the mobile device.

In some embodiments, a method for user authentication of administrative operations for an embedded Universal Integrated Circuit Card (eUICC) included in a mobile device, includes the following, performed by the mobile device: (a) detecting initiation of an administrative operation for an electronic Subscriber Identity Module (eSIM) of the mobile device; (b) determining whether the administrative operation for the eSIM requires user authentication; (c) when the administrative operation for the eSIM requires user authentication: (i) obtaining user credentials, (ii) sending a message based on the user credentials to a server to verify user authorization to perform the administrative operation for the eSIM; and (iii) in response to receipt of an indication of user authorization from the server, performing the administrative operation for the eSIM; and (d) when the administrative operation for the eSIM does not require user authentication, performing the administrative operation for the eSIM.

In some embodiments, the eSIM includes a provisioning eSIM or an emergency services eSIM, and the administrative operation includes switching to the provisioning eSIM or the emergency services eSIM.

In some embodiments, a method for human intent verification of administrative operations for an embedded Universal Integrated Circuit Card (eUICC) included in a mobile device, includes the following, performed by the mobile device: (a) detecting initiation of an administrative operation for an electronic Subscriber Identity Module (eSIM) of the mobile device; (b) determining whether the administrative operation for the eSIM requires human intent verification or user authentication; (c) when the administrative operation for the eSIM requires human intent verification or user authentication: (i) obtaining user credentials via a secure input/output (I/O); (ii) verifying, via secure hardware and/or a trusted execution environment (TEE) of the mobile device, human intent to perform the administrative operation for the eSIM based on the user credentials; and (iii) in response to successful determination of human intent to perform the administrative operation, performing the administrative operation for the eSIM; and (d) when the administrative operation for the eSIM does not require human intent verification or user authentication, performing the administrative operation for the eSIM.

In some embodiments, the eSIM includes a provisioning eSIM or an emergency services eSIM, and the administrative operation includes switching to the provisioning eSIM or the emergency services eSIM. In some embodiments, the method further includes the mobile device: (e) obtaining additional user credentials to authenticate a user of the mobile device; (f) sending a message based on the additional user credentials to a server to verify user authorization to perform the administrative operation for the eSIM; and (g) in response to receipt of an indication of user authorization from the server and successful determination of human intent to perform the administrative operation, performing the administrative operation for the eSIM.

In some embodiments, a mobile device includes wireless circuitry including one o more antennas configurable for wireless communication, one or more processors and a non-transitory storage medium, such as a memory, communicatively coupled to the one or more processors and storing instructions that, when executed by the one or more processors, causes the mobile device to perform one or more methods as substantially described herein.

In some embodiments, an integrated circuit apparatus including one or more processors and memory communicatively coupled to the one or more processors and storing instructions that, when executed by the one or more processors, causes a mobile device that includes the integrated circuit apparatus to perform one or more methods as described herein.

In some embodiments, a non-transitory computer readable medium stores instructions that, when executed by one or more processors of a mobile device, cause the mobile device to perform one or more methods as described herein.

Figure 11:
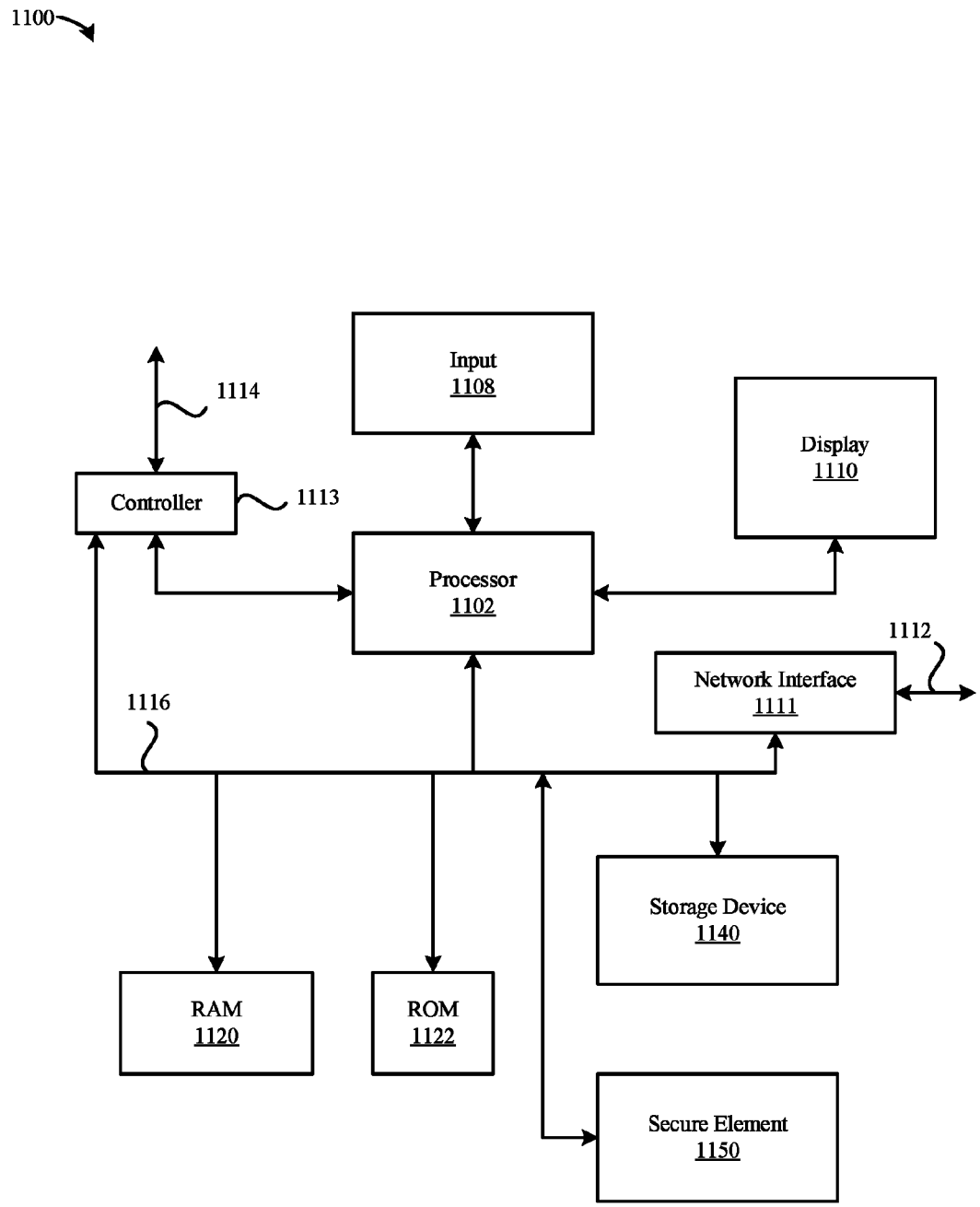
FIG. 11 illustrates a detailed view of a computing device that can be used to implement the various components described herein, according to some embodiments.

FIG. 11 illustrates a detailed view of a computing device 1100 that can be used to implement the various components described herein, according to some embodiments. In particular, the detailed view illustrates various components that can be included in the mobile device 102 illustrated in FIG. 1A. As shown in FIG. 11, the computing device 1100 can include a processor 1102 that represents a microprocessor or controller for controlling the overall operation of computing device 1100. In some embodiments, the processor 1102 includes the processor 104 of the mobile device 102 and/or the application processor 506. The computing device 1100 can also include a user input device 1108 that allows a user of the computing device 1100 to interact with the computing device 1100. For example, the user input device 1108 can take a variety of forms, such as a button, keypad, dial, touch screen, audio input interface, visual/image capture input interface, input in the form of sensor data, etc. In some embodiments, the user input device 1108 includes the secure I/O 122 and/or the biometric sensor 116 of the mobile device 102. In some embodiments, the user input device 1108 can represent a combination of different software controllable inputs including both secure versions, with additional security measures for protecting against malware or other malicious activity, and non-secure versions for normal operation of the computing device 1100. Still further, the computing device 1100 can include a display 1110 (screen display) that can be controlled by the processor 1102 to display information to the user. In some embodiments, control of the display 1110 can include present information and/or obtain information via the display 1110 (e.g., a touch sensitive display). In some embodiments, the display 1110 can be controlled by the processor 1102 to present a secure interface. In some embodiments, the user input device 1108 and/or the display alone or in combination can be in communication with one or more secure elements that provide additional hardware security for displaying and/or obtaining inputs in a secure manner as described in detail herein. A data bus 1116 of the computing device 1100 can facilitate data transfer between at least a storage device 1140, the processor 1102, and a controller 1113. The controller 1113 can be used to interface with and control different equipment through and equipment control bus 1114. The computing device 1100 can also include a network/bus interface 1111 that couples to a data link 1112. In the case of a wireless connection, the network/bus interface 1111 can include a wireless transceiver or more generally a set of wireless circuitry for use to communicate in accordance with one or more wireless communication protocols. In some embodiments, the computing device 1100 can include a combination of both wired and wireless interfaces for connections in accordance with wired and wireless communication protocols.

The computing device 1100 also include a storage device 1140, which can represent a single disk or a plurality of disks (e.g., hard drives), and includes a storage management module that manages one or more partitions within the storage device 1140. In some embodiments, storage device 1140 can include flash memory, semiconductor (solid state) memory or the like. The computing device 1100 can also include a Random Access Memory (RAM) 1120 and a Read-Only Memory (ROM) 1122. The ROM 1122 can store programs, utilities or processes to be executed in a non-volatile manner. The RAM 1120 can provide volatile data storage, and stores instructions related to the operation of the computing device 1100. The computing device 1100 can further include a secure element 1150, which in some embodiments can represent the eUICC 108 described in detail herein.

The various aspects, embodiments, implementations or features of the described embodiments can be used separately or in any combination. Various aspects of the described embodiments can be implemented by software, by hardware, or by a combination of hardware and software. The described embodiments can also be embodied as computer readable code on a computer readable medium. The computer readable medium is any data storage device that can store data, which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for human intent verification of administrative operations for an embedded Universal Integrated Circuit Card (eUICC) included in a mobile device, the method comprising:
    detecting by a processor of the mobile device initiation of an administrative operation for an electronic Subscriber Identity Module (eSIM) of the mobile device;
    determining by the processor of the mobile device whether the administrative operation for the eSIM requires human intent verification or user authentication;
    when the administrative operation for the eSIM requires human intent verification or user authentication:
        obtaining user credentials via a secure input/output (I/O) that is securely connected via end-to-end (E2E) security with secure hardware and/or a trusted execution environment (TEE) of the mobile device;
        verifying, via the secure hardware and/or the TEE of the mobile device, human intent to perform the administrative operation for the eSIM based on the user credentials; and
        in response to successful determination of human intent to perform the administrative operation, performing by the eUICC the administrative operation for the eSIM; and
    when the administrative operation for the eSIM does not require human intent verification or user authentication, performing by the eUICC the administrative operation for the eSIM.

2. The method of 1, wherein:
    the eSIM comprises a provisioning eSIM or an emergency services eSIM; and
    the administrative operation comprises switching to the provisioning eSIM or the emergency services eSIM and does not require human intent verification or user authentication to be performed.

3. The method of 1, further comprising:
    obtaining via the secure I/O additional user credentials to authenticate a user of the mobile device;
    sending by the eUICC a message based on the additional user credentials to a server to verify user authorization to perform the administrative operation for the eSIM; and
    in response to receipt of an indication of user authorization from the server and successful determination of human intent to perform the administrative operation, performing by the eUICC the administrative operation for the eSIM.

4. The method of claim 3, wherein:
    the additional user credentials are associated with a user account for a user of the mobile device, and the additional user credentials are verified by a third party server for the user account.

5. The method of claim 4, wherein the additional user credentials comprise a user login identity and a password for the user account.

6. The method of claim 3, further comprising:
by the eUICC:
obtaining an authentication token based on the additional user credentials; and
generating the message including a signed payload that includes the authentication token.

7. The method of claim 3, wherein the server comprises a level 3 (L3) server configured to manage eSIMs for one or more mobile network operators (MNOs), and the message is signed by the eUICC.

8. The method of claim 1, wherein the secure I/O comprises a biometric sensor of the mobile device.

9. The method of claim 8, wherein the biometric sensor connects to the secure hardware and/or the TEE using symmetric key encryption.

10. The method of claim 1, wherein the administrative operation comprises installation, importing, modification, deletion, or exporting of the eSIM.

11. An apparatus configurable for operation in a mobile device, the apparatus comprising:
a processor; and
a memory storing instructions that when executed by the processor cause the mobile device to perform steps that include:
detecting by a processor of the mobile device initiation of an administrative operation for an electronic Subscriber Identity Module (eSIM) of the mobile device;
determining by the processor of the mobile device whether the administrative operation for the eSIM requires human intent verification or user authentication;
when the administrative operation for the eSIM requires human intent verification or user authentication:
obtaining user credentials via a secure input/output (I/O) that is securely connected via end-to-end (E2E) security with secure hardware and/or a trusted execution environment (TEE) of the mobile device;
verifying, via the secure hardware and/or the TEE of the mobile device, human intent to perform the administrative operation for the eSIM based on the user credentials; and
in response to successful determination of human intent to perform the administrative operation, performing by an embedded Universal Integrated Circuit Card (eUICC) the administrative operation for the eSIM; and
when the administrative operation for the eSIM does not require human intent verification or user authentication, performing by the eUICC the administrative operation for the eSIM.

12. The apparatus of claim 11, wherein:
the eSIM comprises a provisioning eSIM or an emergency services eSIM; and
the administrative operation comprises switching to the provisioning eSIM or the emergency services eSIM and does not require human intent verification or user authentication to be performed.

13. The apparatus of claim 11, wherein execution of the instructions further causes the mobile device to perform steps that include:

obtaining via the secure I/O additional user credentials to authenticate a user of the mobile device;
sending by the eUICC a message based on the additional user credentials to a server to verify user authorization to perform the administrative operation for the eSIM; and
in response to receipt of an indication of user authorization from the server and successful determination of human intent to perform the administrative operation, performing by the eUICC the administrative operation for the eSIM.

14. The apparatus of claim 13, wherein:
the additional user credentials are associated with a user account for a user of the mobile device, and
the additional user credentials are verified by a third party server for the user account.

15. The apparatus of claim 14, wherein the additional user credentials comprise a user login identity and a password for the user account.

16. The apparatus of claim 13, wherein execution of the instructions further causes the mobile device to perform steps that include:
by the eUICC:
obtaining an authentication token based on the additional user credentials; and
generating the message including a signed payload that includes the authentication token.

17. The apparatus of claim 13, wherein the server comprises a level 3 (L3) server configured to manage eSIMs for one or more mobile network operators (MNOs), and the message is signed by the eUICC.

18. The apparatus of claim 11, wherein the secure I/O comprises a biometric sensor of the mobile device.

19. The apparatus of claim 11, wherein the administrative operation comprises installation, importing, modification, deletion, or exporting of the eSIM.

20. A mobile device comprising:
an embedded Universal Integrated Circuit Card (eUICC);
a secure hardware element communicatively coupled to the eUICC:
a secure input/output (I/O) securely coupled to the secure hardware element;
a processor; and
a memory communicatively coupled to the processor storing instructions that when executed by the processor cause the mobile device to perform steps that include:
detecting by the processor of the mobile device initiation of an administrative operation for an electronic Subscriber Identity Module (eSIM) of the mobile device;
determining by the processor of the mobile device whether the administrative operation for the eSIM requires human intent verification or user authentication;
when the administrative operation for the eSIM requires human intent verification or user authentication:
obtaining user credentials via the secure I/O that is securely connected via end-to-end (E2E) security with the secure hardware element of the mobile device;
verifying, via the secure hardware element of the mobile device, human intent to perform the administrative operation for the eSIM based on the user credentials; and in response to successful determination of human intent to perform the administrative operation, performing by the eUICC the administrative operation for the eSIM; and when the administrative operation for the eSIM does not require human intent verification or user authentication, performing by the eUICC the administrative operation for the eSIM.

\* \* \* \* \*